US011435146B2

(12) United States Patent
Desgrosseilliers

(10) Patent No.: US 11,435,146 B2
(45) Date of Patent: Sep. 6, 2022

(54) THERMAL ENERGY STORAGE APPARATUS

(71) Applicant: Neothermal Energy Storage Inc., Bridgewater (CA)

(72) Inventor: Louis Desgrosseilliers, Bridgewater (CA)

(73) Assignee: Neothermal Energy Storage Inc., Bridgewater (CA)

(*) Notice: Subject to any disclaimer, the term of this patent is extended or adjusted under 35 U.S.C. 154(b) by 288 days.

(21) Appl. No.: 16/811,475

(22) Filed: Mar. 6, 2020

(65) Prior Publication Data
US 2020/0284526 A1 Sep. 10, 2020

Related U.S. Application Data

(60) Provisional application No. 62/815,098, filed on Mar. 7, 2019.

(51) Int. Cl.
*F28D 20/02* (2006.01)
*F28D 17/00* (2006.01)

(52) U.S. Cl.
CPC ............ *F28D 20/021* (2013.01); *F28D 17/00* (2013.01); *F28D 20/025* (2013.01); *Y02E 60/14* (2013.01)

(58) Field of Classification Search
CPC ......... F28D 20/021; F28D 20/02; Y02E 60/14
See application file for complete search history.

(56) References Cited

U.S. PATENT DOCUMENTS 3,285,470 A 11/1966 Heinrich et al.
4,077,390 A 3/1978 Stanley et al.
(Continued)

FOREIGN PATENT DOCUMENTS

DE 2619514 A1 * 11/1976
DE 2619514 A1 11/1976
(Continued)

OTHER PUBLICATIONS

Anthony et al., "Verification of a Mechanism for Nucleating Crystallization of Supercooled Liquids," Materials Chemistry and Physics 25:199-205, 1990.
Araki et al., "Measurements of Thermophysical Properties of Sodium Acetate Hydrate," International Journal of Thermophysics 16(6):1455-1466, 1995.
(Continued)

*Primary Examiner* — Devon Russell
(74) *Attorney, Agent, or Firm* — Cozen O'Connor

(57) ABSTRACT

A thermal energy storage apparatus is disclosed. The apparatus may include a base and fluid flow plates which cooperate with the base to define a cavity; a phase change material contained within the cavity; an external seed crystal reservoir trigger assembly at least partially positioned within the phase change material; and end plates which cooperate with the fluid flow plates to define fluid flow channels. The apparatus may include a housing that holds a heat exchanger and phase change material. Inlet and outlet ports allow for the ingress and egress of a heat exchange fluid into the fluid flow channels or heat exchanger. In operation, actuation of the external seed crystal reservoir trigger assembly to an open state induces solidification of at least a portion of the phase change material from a supercooled liquid state to a solid state, releasing thermal energy, allowing for the transfer of thermal energy across the fluid flow plates or heat exchanger from the phase change material to the heat exchange fluid.

20 Claims, 17 Drawing Sheets

(56) References Cited

U.S. PATENT DOCUMENTS

| | | | |
|---|---|---|---|
| 4,141,760 A | 2/1979 | Baldi | |
| 4,211,208 A | 7/1980 | Lindner | |
| 4,574,051 A | 3/1986 | Matthews et al. | |
| 4,829,980 A | 5/1989 | Smith | |
| 4,860,729 A | 8/1989 | Benson et al. | |
| 5,056,589 A | 10/1991 | Hettel et al. | |
| 5,083,605 A | 1/1992 | Collings | |
| 5,261,482 A | 11/1993 | Lomax et al. | |
| 5,608,610 A | 3/1997 | Brzezinski | |
| 5,645,749 A | 7/1997 | Wang | |
| RE35,586 E | 8/1997 | Manker | |
| 5,687,706 A | 11/1997 | Goswami et al. | |
| 5,755,104 A | 5/1998 | Rafalovich et al. | |
| 5,954,119 A * | 9/1999 | Yamamura | F28D 20/02 126/263.01 |
| 6,178,963 B1 | 1/2001 | Baik | |
| 6,298,676 B1 | 10/2001 | Osborne et al. | |
| 6,308,518 B1 | 10/2001 | Hunter | |
| 7,147,071 B2 | 12/2006 | Gering et al. | |
| 7,159,643 B2 | 1/2007 | Kudo | |
| 7,793,651 B2 | 9/2010 | Sawada et al. | |
| 8,739,525 B2 | 6/2014 | Mankame et al. | |
| 9,605,874 B2 | 3/2017 | Rademacher et al. | |
| 10,344,816 B2 | 7/2019 | Karimi-Moghaddam et al. | |
| 2004/0251011 A1 | 12/2004 | Kudo | |
| 2011/0083826 A1 | 4/2011 | Matta et al. | |
| 2011/0226440 A1 | 9/2011 | Bissell et al. | |
| 2012/0037148 A1 | 2/2012 | Tudor et al. | |
| 2012/0227926 A1 | 9/2012 | Field et al. | |
| 2012/0279679 A1 | 11/2012 | Soukhojak et al. | |
| 2013/0199751 A1 | 8/2013 | Levin et al. | |
| 2014/0102662 A1 | 4/2014 | Grama et al. | |
| 2014/0130844 A1* | 5/2014 | Yagi | F28D 20/02 136/246 |
| 2014/0138042 A1 | 5/2014 | Yagi et al. | |
| 2014/0261380 A1 | 9/2014 | Rademacher et al. | |
| 2015/0224850 A1 | 8/2015 | Bank et al. | |
| 2015/0345874 A1* | 12/2015 | Honda | F28D 20/028 165/10 |
| 2017/0122674 A1* | 5/2017 | Nishida | B01D 9/005 |
| 2017/0205152 A1 | 7/2017 | Grama et al. | |
| 2017/0219294 A1 | 8/2017 | Longis et al. | |
| 2018/0017337 A1* | 1/2018 | Desgrosseilliers | F28D 20/0034 |
| 2019/0072338 A1 | 3/2019 | Wirz et al. | |

FOREIGN PATENT DOCUMENTS

| | | |
|---|---|---|
| JP | S62172190 A | 7/1987 |
| JP | S63189789 A | 8/1988 |
| JP | S6410098 A | 1/1989 |
| JP | 2007285627 A | 11/2007 |
| JP | 2013194970 A | 9/2013 |
| JP | 2014137153 A | 7/2014 |
| WO | 2007023793 A1 | 3/2007 |
| WO | 2010008329 A1 | 1/2010 |
| WO | 2011038891 A2 | 4/2011 |

OTHER PUBLICATIONS

Chevrolet Volt Battery 101, retrieved from www.formula-hybrid. org/wp-content/uploads/Chevrolet-Volt-Battery_101.pdf, download date Aug. 15, 2016, 7 pages.

Choi et al., "Heat transfer characteristics in low-temperature latent heat storage systems using salt-hydrates at heat recovery stage," Solar Energy Materials and Solar Cells 40:71-87, 1996.

Dannemand et al., "Laboratory test of a prototype heat storage module based on stable supercooling of sodium acetate trihydrate," Energy Procedia 70:172-181, 2015.

Dannemand et al., "Long term thermal energy storage with stable supercooled sodium acetate trihydrate," Applied Thermal Engineering 91:671-678, 2015.

Desgrosseilliers et al., "Heat conduction in laminate multilayer bodies with applied finite heat source," International Journal of Thermal Sciences 72:47-59, 2013.

Desgrosseilliers et al., "Thermodynamic Evaluation of Supercooled Seasonal Heat Storage at the Drake Landing Solar Community," Eurotherm Seminar 99,10 pages, 2014.

Desgrosseilliers et al., "Thermographic validation of a novel, laminate body, analytical heat conduction model," Heat and Mass Transfer 50:895-905, 2014.

Desgrosseilliers et al., "Two-Region Fin Model Adjacent Temperature Profile Interactions," Proceedings of the 15th International Heat Transfer Conference, IHTC-15,15 pages, 2014.

Desgrosseilliers et al., "Validation of a heat conduction model for finite domain, non-uniformly heated, laminate bodies," Heat and Mass Transfer 51(8),13 pages, 2015.

Desgrosseilliers, "Heat Transfer Enhancements Using Laminate Film Encapsulation for Phase Change Heat Storage Materials," Master's Thesis, Dalhousie University, Halifax, Nova Scotia, 2012, 118 pages.

Fan et al., "Thermal behavior of a heat exchanger module for seasonal heat storage," Energy Procedia 30:244-254, 2012.

Furbo et al., "Development of seasonal heat storage based on stable supercooling of a sodium acetate water mixture," Energy Procedia 30:260-269, 2012.

Garg et al., Solar Thermal Energy Storage, D. Reidel Publishing Company, 1985, Chapter 3, "Latent Heat or Phase Change Thermal," vi-vii; 154-289. (132 pages).

Green et al., Perry's Chemical Engineers' Handbook, 8th edition, McGraw-Hill Professional, 2008, Chapter 11, "Compact and Nontubular Heat Exchangers," 13 pages.

Green et al., Perry's Chemical Engineers' Handbook, 8th edition, McGraw-Hill Professional, 2008, Chapter 11, "Thermal Design of Heat-Transfer Equipment," 62 pages.

Günther et al., "Melting and nucleation temperatures of three salt hydrate phase change materials under static pressures up to 800 MPa," Journal of Physics D: Applied Physics 40:4636-4641, 2007.

H. M. Heizkorper, "Thermobatterie hybridheizkörper," H.M. Heizkorper GmbH & Co. KG, Dingelstadt, Germany, 2012, 8 pages (translation not available).

Hirano et al., "Influence of Operating Temperature on Efficiency of Supercooled Thermal Energy Storage," 37th Intersociety Energy Conversion Engineering Conference (IECEC):684-689, 2002.

Hirano et al., "Long-Term Performance of Latent Heat Thermal Energy Storage Using Supercooling," Proceedings of the ISES Solar World Congress 2007: Solar Energy and Human Settlement:2741-2745, 2007.

International Search Report and Written Opinion for PCT/CA2017/050832, dated Oct. 12, 2017, 6 pages.

Khoshvaght-Aliabadi, "Thermal performance of plate-fin heat exchanger using passive techniques: vortex-generator and nanofluid," Heat Mass Transfer 52:819-828, 2016.

Lane et al., "Macro-Encapsulation of Heat Storage Phase-Change Materials for Use in Residential Buildings," Final Report, The Dow Chemical Company, Midland, Michigan, 1978, 164 pages.

Lane, "Low temperature heat storage with phase change materials," The International Journal of Ambient Energy 1:155-168, 1980.

Lane, "PCM Science and Technology: The Essential Connection," ASHRAE Transactions 91(2B):1897-1909, 1985.

Letcher, Storing Energy—With Special Reference to Renewable Energy Sources, Elsevier, Amsterdam, Netherlands, 2016, 592 pages.

McCabe et al., "Unit Operations of Chemical Engineering," 7th edition, McGraw-Hill Education, 2005, pp. 455-457. (3 pages).

Medrano et al., "Experimental evaluation of commercial heat exchangers for use as PCM thermal storage systems," Applied Energy 86:2047-2055, 2009.

Pendyala, "Macroencapsulation of Phase Change Materials for Thermal Energy Storage," graduate theses and dissertations. University of South Florida, Tampa, Florida, 2012, 105 pages.

Pinel et al., "A review of available methods for seasonal storage of solar thermal energy in residential applications," Renewable and Sustainable Energy Reviews 15:3341-3359, 2011.

Rogerson et al., "Solidification in Heat Packs: II. Role of Cavitation," AIChE Journal 49(2):516-521, 2003.

(56) References Cited

OTHER PUBLICATIONS

Rogerson et al., "Solidification in Heat Packs: III. Metallic Trigger," AIChE Journal 49(2):522-529, 2003.
Sandnes, "Exergy Efficient Production, Storage and Distribution of Solar Energy," Doctoral Thesis, University of Oslo, Oslo, Norway, 2003, 176 pages.
Sandnes, "The physics and the chemistry of the heat pad," American Journal of Physics 76(6):546-550, 2008.
Sibbitt et al., "The Performance of a High Solar Fraction Seasonal Storage District Heating System—Five Years of Operation," Energy Procedia 00, 10 pages, 2011.
Streicher et al., "Laboratory prototypes of PCM storage units," International Energy Agency, May 2007, 43 pages.
Streicher et al., "Storage based on Phase Change Materials (PCM)—Selection of concepts," International Energy Agency, Feb. 2005, 14 pages.
Targray, "Aluminum Laminate Pouch," Targray, Kirkland, Canada, 2012, 2 pages.
Wei et al., "Supercooling and Solidification Behavior of Phase Change Material," ISIJ International 50(9):1265-1269, 2010.
Wettermark et al., Storage of Heat, Swedish Council for Building Research, Stockholm, Sweden, 1979, pp. 1-163. (92 pages).
Zhang et al., "Characterization of sugar alcohols as seasonal heat storage media—experimental and theoretical investigations," Eurotherm Seminar 99—Advances in Thermal Energy Storage, EUROTHERM99-01-020,11 pages, 2014.

\* cited by examiner

THERMAL ENERGY STORAGE APPARATUS

TECHNICAL FIELD

The present disclosure relates to an apparatus for storing and releasing thermal energy.

BACKGROUND

Description of the Related Art

Thermal energy is used for space and water heating, among other things. Thermal energy may be generated or liberated through the combustion of biomass or hydrocarbon-based products such as wood, heating oil, propane, or natural gas, for example. Such products are fairly stable and can be stored for fairly long periods of time without degradation or loss of potential thermal energy release. Such products can also be fairly easily transported without significant degradation or loss of potential thermal energy release. These properties allow for combustion and release of thermal energy at a time and location selected for a particular requirement.

It is difficult however, to generate materials that store thermal energy from transient heat sources, such as solar power, for transport and later release of thermal energy. In an example, thermal energy may be collected by a solar thermal system, generated as electric or resistive heat from electricity supplied by photovoltaics or wind turbines, for example, from a ground source heat pump, or from waste heat sources, such as from effluent from a manufacturing, or thermal power plant. Generating biomass or hydrocarbon materials from such sources is difficult and inefficient. Such thermal energy may be stored by heating water or other thermal masses, such as glycol, and may be transported or stored in insulated tanks, for example. However, such storage is only effective for short-term storage as the thermal energy will dissipate to the external environment through conduction or other means. Thus, a hot water tank, as an example, is not effective long term thermal energy storage mechanism, even with thermal insulation.

A useful long term thermal energy storage system is desired. In particular, a long term thermal energy storage system that has the ability to store thermal energy, to transport stored thermal energy from a source to a desired location, and to release such thermal energy at a desired time without significant loss of thermal energy over time, is desired. A solar thermal system with a transportable thermal energy storage system with minimal loss of thermal energy storage, over days or months, could allow for reduced area of solar collectors which could, in turn, reduce the associated cost of the solar collector.

It is known that thermal energy may be stored in certain phase change materials in a supercooled liquid state. Such a phase change material undergoes a phase transition from solid to liquid at an elevated temperature and when cooled, remains stable in a higher energy supercooled liquid state, below the phase transition temperature. Such a phase change material avoids spontaneously reverting to the lower energy solid state, and as such, can maintain thermal energy associated with the phase transition from the supercooled liquid state to the solid state. Salt hydrates with good solidification rates with respect to heat transfer, high latent heats of transition, and suitable transition temperatures exhibit strong supercooling behaviour and are good candidates for a phase change material based thermal energy storage apparatus. Sodium acetate trihydrate ($NaCH_3CO_2 \cdot 3H_2O$) is a safe and easily created material that can be supercooled to temperatures up to 108° Kelvin below the liquid-solid phase transition temperature and can be kept supercooled for significant periods of time, exceeding one year, typically beyond the durations required of a stored thermal energy system.

Sodium acetate trihydrate has long been used for supercooled liquid thermal energy storage in flexible heat packs for ready-to-use localized warming, for use as hand warmers, for example. In such instances, solid sodium acetate trihydrate in excess water is heated above the melting temperature, melted and fully dissolved, and then cooled and stored in a supercooled liquid state. The supercooled liquid sodium acetate trihydrate can then be triggered to solidify, releasing stored thermal energy at a desired time and location. The release of thermal energy in such flexible hand warmer heat packs is typically accomplished by manually flexing a pre-strained metallic flexible disc located inside the heat pack, immersed within the phase change material. The flexible metal disc is typically fitted with grooves that contain a trapped seed crystal of solid sodium acetate trihydrate. When the flexible disc is flexed, the grooves open and exposes the supercooled liquid sodium acetate trihydrate to the trapped seed crystal. The supercooled liquid sodium acetate trihydrate then crystalizes around the seed crystal, and in the process of solidifying, releases stored thermal energy.

Flexible hand warmer packs however, rely upon manual manipulation of the flexible disc to trigger the solidification process. To permit the manipulation of the flexible disc, the hand-warmer packs are typically made of a flexible translucent pouch which allows an operator to locate the flexible disc and then manipulate the flexible disc, through deformation of the flexible pouch. That is, to be manually manipulated, the flexible pouch must be sufficiently translucent, to locate the flexible disc, must be sufficiently small to allow for the external operator to be able to reach the flexible disc, and the pouch must be sufficiently flexible to allow for the flexion of the flexible disc.

Scaling a flexible heat pack to larger applications poses certain problems. The flexible disc typically moves freely within the supercooled sodium acetate trihydrate liquid. A pouch that is too large to allow for external manipulation of the flexible disc would frustrate the ability to manipulate the flexible disc to trigger nucleation and the release of thermal energy. That is, the pouch is limited in size. Secondly, locating the flexible disc within the supercooled liquid makes automation of the manipulation difficult. That is, an operator must visually locate the flexible disc for manipulation. Thirdly, the flexible nature of the pouch, required to allow for manipulation of the flexible disc, makes it difficult to incorporate within a heat exchange system. Fourthly, the pouch construction of flexible heat packs is a poor candidate for optimizing heat transfer rates with an external fluid medium.

BRIEF SUMMARY

A modular thermal energy storage apparatus can be summarized as having a housing defining a cavity; a phase change material located within the cavity; the housing equipped with a sidewall fitting (aka bulkhead fitting) to provide an external fluid connection; an external seed crystal reservoir trigger assembly that is operable via an isolation valve; the external seed crystal reservoir trigger assembly containing a reserve of solid phase change material; the external seed crystal reservoir trigger assembly in fluid communication with the cavity of the housing and phase change material contained within the cavity of the housing via the sidewall fitting and in thermal communication (e.g., thermally conductive) with the housing and in thermal communication with the phase change material contained within the cavity of the housing via the sidewall fitting; the phase change material which may exist in a melted or solid state; wherein opening the isolation valve of the external seed crystal reservoir trigger assembly triggers solidification of the phase change material and a release of thermal energy.

A thermal energy storage apparatus can be summarized as including: a base; a first fluid flow plate positioned so as to cooperate with the base to define a cavity; a phase change material which may exist in a melted or solid state, contained within the cavity; the base equipped with a first sidewall fitting (aka bulkhead fitting) to provide a first external fluid connection; a first external seed crystal reservoir trigger assembly that is operable via a first isolation valve; the first external seed crystal reservoir trigger assembly containing a reserve of solid phase change material; the first external seed crystal reservoir trigger assembly in fluid communication with the cavity and phase change material contained within the cavity via the first sidewall fitting and in thermal communication (e.g., thermally conductive) with the base and phase change material contained within the cavity via the first sidewall fitting; a first end plate positioned so as to cooperate with the first fluid flow plate to define a first fluid flow channel; a first fluid inlet port in fluid communication with the first fluid flow channel for the ingress of a heat exchange fluid into the first fluid flow channel and a first fluid outlet port in fluid communication with the first fluid flow channel for the egress of the heat exchange fluid from the first fluid flow channel; such that opening the isolation valve of the first external seed crystal reservoir trigger assembly induces solidification of at least a portion of the phase change material from a supercooled liquid state to a solid state, releasing thermal energy allowing for the transfer of thermal energy across the first fluid flow plate from the phase change material to the heat exchange fluid in the first fluid flow channel.

A thermal energy storage apparatus can be summarized as including: a base; a fluid flow plate assembly comprising at least one fluid flow channel positioned so as to cooperate with the base to define a cavity; a phase change material which may exist in a melted or solid state, contained within the cavity; the base equipped with a first sidewall fitting (aka bulkhead fitting) to provide a first external fluid connection; a first external seed crystal reservoir trigger assembly that is operable via a first isolation valve; the first external seed crystal reservoir trigger assembly containing a reserve of solid phase change material; the first external seed crystal reservoir trigger assembly in fluid communication with the cavity and phase change material contained within the cavity via the first sidewall fitting and in thermal communication (e.g., thermally conductive) with the base and the phase change material contained within the cavity via the first sidewall fitting; a first fluid inlet port in fluid communication with the first fluid flow channel for the ingress of a heat exchange fluid into the fluid flow channel and a first fluid outlet port in fluid communication with the fluid flow channel for the egress of the heat exchange fluid from the fluid flow channel; such that opening the isolation valve of the first external seed crystal reservoir trigger assembly induces solidification of at least a portion of the phase change material from a supercooled liquid state to a solid state, releasing thermal energy allowing for the transfer of thermal energy across the fluid flow plate from the phase change material to the heat exchange fluid in the fluid flow channel.

A thermal energy storage apparatus can be summarized as including: a base; a first fluid flow plate and a second fluid flow plate, the first and second fluid flow plates positioned so as to cooperate with the base to define a cavity; a phase change material which may exist in a melted or solid state contained within the cavity; the base equipped with a first sidewall fitting (aka bulkhead fitting) to provide a first external fluid connection; a first external seed crystal reservoir trigger assembly that is operable via a first isolation valve; the first external seed crystal reservoir trigger assembly containing a reserve of solid phase change material; the first external seed crystal reservoir trigger assembly in fluid communication with the cavity and phase change material contained within the cavity via the first sidewall fitting and in thermal communication (e.g., thermally conductive) with the base and phase change material contained within the cavity via the first sidewall fitting; a first end plate positioned so as to cooperate with the first fluid flow plate to define a first fluid flow channel; a second end plate positioned so as to cooperate with the second fluid flow plate to define a second fluid flow channel, a first fluid inlet port in fluid communication with the first fluid flow channel for the ingress of a heat exchange fluid into the first fluid flow channel and a first fluid outlet port in fluid communication with the first fluid flow channel for the egress of the heat exchange fluid from the first fluid flow channel; a second fluid inlet port in fluid communication with the second fluid flow channel for the ingress of a heat exchange fluid into the second fluid flow channel and a second fluid outlet port in fluid communication with the second fluid flow channel for the egress of the heat exchange fluid from the second fluid flow channel; such that opening the isolation valve of the first external seed crystal reservoir trigger assembly induces solidification of at least a portion of the phase change material from a supercooled liquid state to a solid state, releasing thermal energy allowing for the transfer of thermal energy from the phase change material across the first fluid flow plate and the second fluid flow plate to the heat exchange fluid in the first fluid flow channel and the second fluid flow channel.

A thermal energy storage apparatus can be summarized as including: at least one base; an at least one fluid flow plate positioned so as to cooperate with the base to define at least one cavity; a phase change material which may exist in a melted or solid state contained within at least one of the at least one cavity; at least one base equipped with at least one sidewall fitting (aka bulkhead fitting) to provide an at least one external fluid connection; at least one external seed crystal reservoir trigger assembly that is operable via at least one isolation valve; the at least one external seed crystal reservoir trigger assembly containing at least one reserve of solid phase change material; the at least one external seed crystal reservoir trigger assembly in fluid communication with at least one of the at least one cavities and the phase change material contained within the at least one of the cavities via the at least one sidewall fitting and in thermal communication (e.g., thermally conductive) with the at least one base and phase change material contained within the at least one cavity via its at least one sidewall fitting; an at least one end plate positioned so as to cooperate with the at least one fluid flow plate to define an at least one first fluid flow channel; an at least one fluid inlet port in fluid communication with the at least one fluid flow channel for the ingress of a heat exchange fluid into the at least one fluid flow channel, and an at least one fluid outlet port in fluid communication with the at least one fluid flow channel for the egress of the heat exchange fluid from the at least one fluid flow channel; such that opening the isolation valve of the at least one external seed crystal reservoir trigger assembly induces solidification of at least a portion of the phase change material from a supercooled liquid state to a solid state, releasing thermal energy allowing for the transfer of thermal energy across the at least one fluid flow plate from the phase change material to the heat exchange fluid in the at least one fluid flow channel.

In any of the above implementations, the thermal energy storage apparatus can further include a baffle within the cavity which obstructs the sinking of solid phase change material.

In any of the above implementations, the thermal energy storage apparatus can include at least one baffle oriented substantially vertically in thermal communication with the phase change material and a fluid flow plate.

In any of the above implementations, the cavity can be substantially cylindrical.

In any of the above implementations, the phase change material can comprise or consist of an organic material. In any of the above implementations, the phase change material can comprise or consist of an inorganic material. In any of the above implementations, the phase change material can comprise a combination of both organic and inorganic materials. In any of the above implementations, the phase change material can comprise sodium acetate trihydrate. In any of the above implementations, the phase change material can comprise sodium acetate trihydrate with additional water.

In any of the above implementations, the thermal energy storage apparatus can further include a film disposed between the base and the first fluid flow plate, wherein the film chemically isolates the first fluid flow plate from the phase change material while maintaining thermal conductivity between the first fluid flow plate and the phase change material.

In any of the above implementations, a fluid flow plate can be comprised of aluminum bonded to stainless steel.

In any of the above implementations, a seal can be disposed between a fluid flow plate and the end plate, sealing the fluid flow channel. In any of the above implementations, a seal can be disposed between the fluid flow plate and the base, sealing the cavity.

In any of the above implementations, the upper portion of the base can further comprise at least one pressure balancing port to allow for air/vapour to flow via a fitting and external hosing for the purpose of relieving excess pressure or vacuum within the cavity as the result of thermal expansion of the phase change material. In any of the above implementations, the base may further comprise at least one port to allow for filling the cavity with the phase change material.

In any of the above implementations, the isolation valve of the external seed crystal reservoir trigger assembly can comprise a ball valve with a metallic body. In any of the above implementations, the isolation valve of the external seed crystal reservoir trigger assembly can comprise a motorized ball valve with a metallic body.

In any of the above implementations, the external seed crystal reservoir trigger assembly can further comprise of a hose or tube that contains the solid phase change material, the hose or tube connected to an isolation valve. In any of the above implementations, the external seed crystal reservoir trigger assembly can be partly filled with a reserve of solid phase change material.

In any of the above implementations, the external seed crystal reservoir trigger assembly may be in a fluid communication with the pressure balancing port. In any of the above implementations, the external seed crystal reservoir trigger assembly may further comprise a second isolation valve that fluidly communicatively couples the external seed crystal reservoir trigger assembly to the pressure balancing port.

In any of the above implementations, the sidewall fitting may take the form of a fluid port that traverses the side wall of the base.

In any of the above implementations, the sidewall fitting may comprise a port in the base wall. In any of the above implementations, the sidewall fitting may comprise a fitting that is welded to the base wall. In any of the above implementations, the sidewall fitting may comprise a fitting that is mechanically fastened to the base wall and sealed using a compression seal.

In any of the above implementations, a fluid flow plate can be disposed with at least one flow director. In any of the above implementations, an end plate can be disposed with at least one flow director. In any of the above implementations, the fluid flow plate and the end plate cooperate to define at least one flow director.

In any of the above implementations, the fluid inlet port can traverse a portion of the base before being in fluid communication with the fluid flow channel. In any of the above implementations, the fluid outlet port can traverse a portion of the base after being in fluid communication with the fluid flow channel.

In any of the above implementations, the fluid inlet port can traverse a substantial portion of the base before being in fluid communication with the fluid flow channel.

In any of the above implementations, the first fluid inlet port and the second fluid inlet port can be in fluid communication with each other within the base. In any of the above implementations, the first fluid outlet port and the second fluid outlet port can be in fluid communication with each other within the base.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known materials, structures and methods associated with vehicles have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a", "an", and "the" include plural referents unless the content clearly dictates otherwise. It should also be noted that the term "or" is generally employed in its sense including "and/or" unless the content clearly dictates otherwise.

The headings and Abstract provided herein are for convenience only and do not interpret the scope or meaning of the embodiments.

Figure 1:
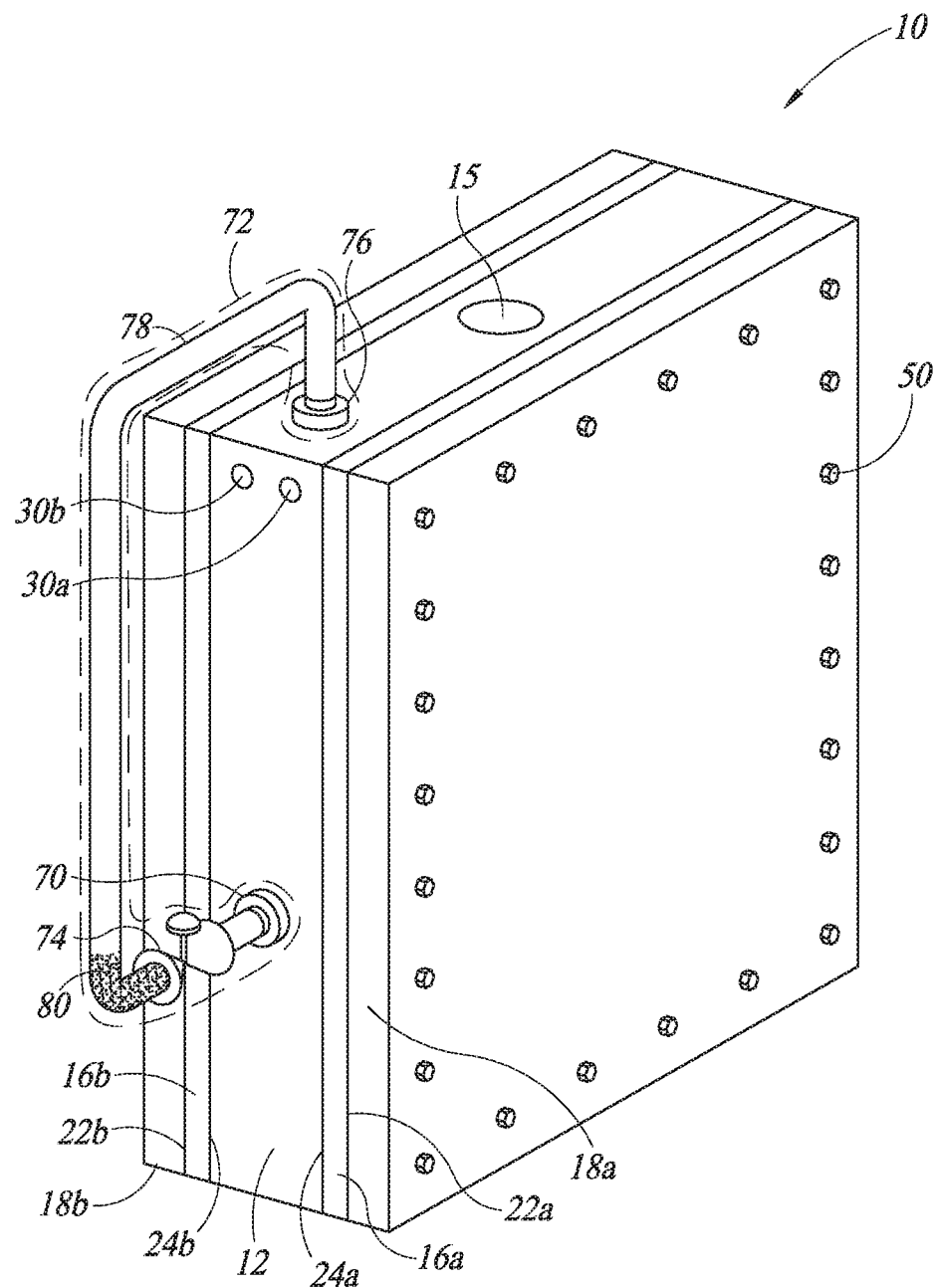
FIG. 1 is a perspective view of a thermal energy storage apparatus according to at least one illustrated embodiment, which includes an external seed crystal reservoir trigger assembly to contain a reserve of solid phase change material and that is operable via a first isolation valve and which is in thermal and fluid communication with the base and the phase change material contained within the cavity of the base via a first sidewall fitting.

FIG. 1 shows a perspective view of a thermal energy storage apparatus 10 according to at least one illustrated embodiment. Thermal energy storage apparatus 10 is shown with base 12. Moving outwardly from base 12, disposed on either side of base 12 may be film 24a and 24b. Film 24a and 24b may not be required depending on the particular structure and material of manufacture of fluid flow plates 16a and 16b, as is explained later in this disclosure. Base 12 and flow plates 16a and 16b collectively comprise a housing. Disposed on either side of optional film 24a and 24b, if incorporated, are fluid flow plates 16a and 16b. Disposed on either side of fluid flow plates 16a and 16b may be gaskets or seals 22a and 22b. Gaskets or seals 22a and 22b may not be required depending on the particular structure and material of manufacture of fluid flow plates 16a and 16b and end plates 18a and 18b, as is explained later in this disclosure. Disposed on either side of gaskets or seals 22a and 22b, if incorporated, are end plates 18a and 18b.

FIG. 1 further shows heat exchange fluid inlets 30a and 30b to allow for the ingress of a heat exchange fluid into the thermal energy storage apparatus 10. Corresponding heat exchange fluid outlets are described later in this disclosure. FIG. 1 shows port 15 which may be a sealed cap or threaded cap, for example, allowing for pouring in phase change material 14 or for the removal of phase change material 14 from cavity 13. FIG. 1 further shows compression fastener(s) 50 which compresses the elements of base 12, film 22A and 22B, fluid flow plates 16A and 16B, gaskets or seals 22A and 22B, and end plates 18A and 18B, forming the basic structure of the thermal energy storage apparatus 10, according to this embodiment. The compression fastener(s) 50 can, for example, take the form of screws and matching threaded receptacles, threaded bolts and complementary nuts, clamps, and/or compression bands (e.g., spring steel bands).

Figure 2:
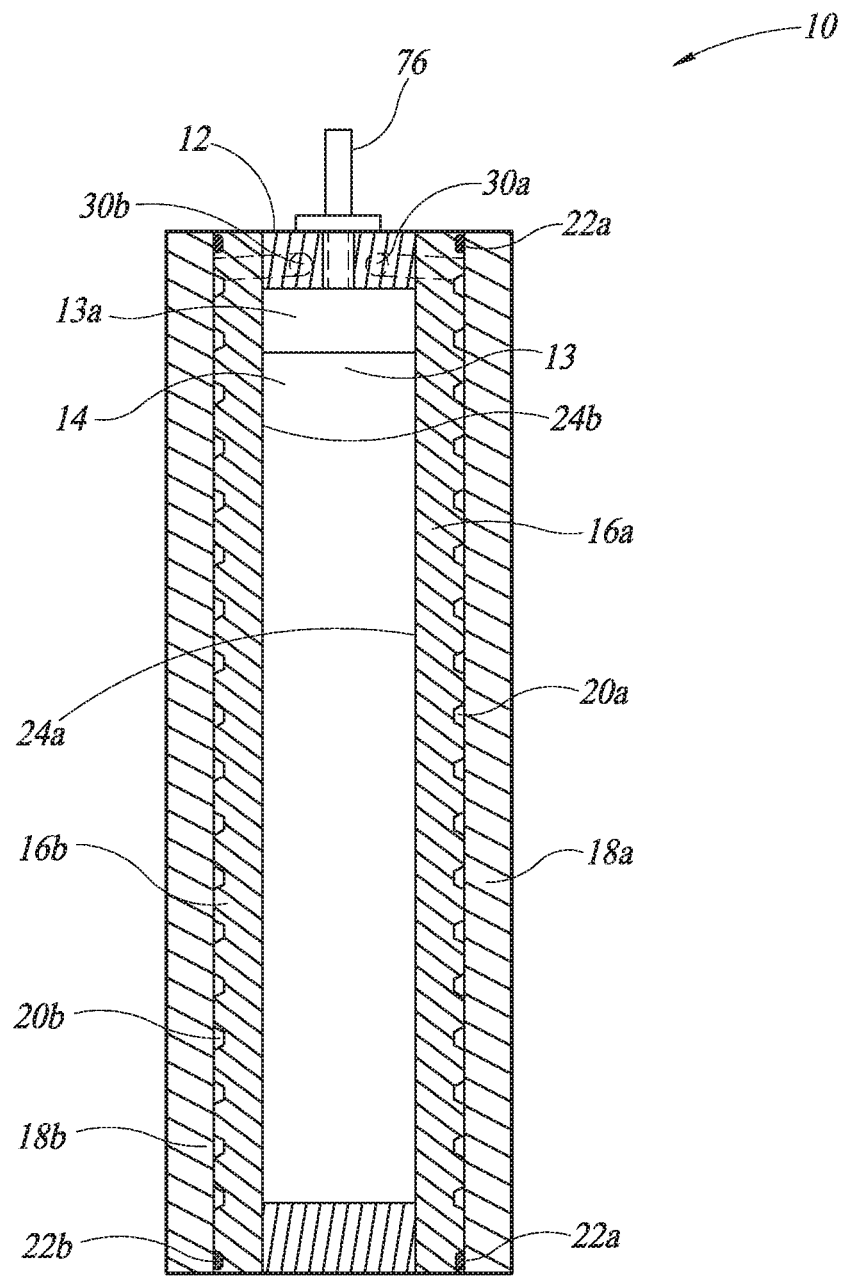
FIG. 2 is a cross-section view of the thermal energy storage apparatus of FIG. 1 from a front side thereof according to at least one illustrated embodiment.

FIG. 2 shows a cross-sectional view of thermal energy storage apparatus 10 according to at least one illustrated embodiment. On either side of base 12 is disposed film 24A and 24B. On either side of film 24*a* and 24*b* are fluid flow plates 16*a* and 16*b*.

Base 12 cooperates with fluid flow plate 16*a*, with film 24*a* optimally disposed between base 12 and fluid flow plate 16*a*, and base 12 cooperates with fluid flow plate 16*b*, with film 24*b* optimally disposed between base 12 and fluid flow plate 16*b*, to collectively define cavity 13. Phase change material 14 is disposed in cavity 13. Phase change material 14 may not fill the entirety of cavity 13 leaving a vapour space 13*a* above the phase change material 14, accommodating any thermal expansion of the phase change material.

Fluid flow plate 16*a* and end plate 18*a* cooperate to define a fluid flow channel 20*a*. Fluid flow plate 16*a* and end plate 18*a* may be optimally sealed by gasket or seal 22*a* to seal fluid flow channel 20*a*. Fluid flow plate 16*b* and end plate 18*b* cooperate to define fluid flow channel 20*b* on the other side of base 12. Fluid flow plate 16*b* and end plate 18*b* may be optimally sealed by gasket or seal 22*b* to seal fluid flow channel 20*b*.

Sidewall fitting 70 traverses the wall of base 12 into cavity 13 and positioned to be at least partially submerged by phase change material 14. External seed crystal reservoir trigger assembly 72 is fixed and sealed to sidewall fitting 70 via a threaded or fused connection (weld, braze, solder, or adhesive) to isolation valve 74. Seed crystal reservoir tube 78 is fixed to the remaining port of isolation valve 74 at one end of seed crystal reservoir tube 78 and fixed to pressure balancing port 76 at the other end of the seed crystal reservoir tube 78. A solid phase change material reserve 80 is contained within seed crystal reservoir tube 78. Fluid flow plate 16A is in thermal communication (e.g., thermally conductive) with phase change material 14, via film 24*a*, where employed, allowing thermal energy to flow between fluid flow plate 16*a* and phase change material 14. Fluid flow plate 16*b* is in thermal communication (e.g., thermally conductive) with phase change material 14 via film 24*b*, where employed, allowing thermal energy to flow between fluid flow plate 16*b* and phase change material 14.

Heat exchange fluid inlet 30*a* is in fluid communication with fluid flow channel 20*a* via base 12 as shown by the dashed lines in FIG. 2. Heat exchange fluid inlet 30*b* is in fluid communication with fluid flow channel 20*b* via base 12 as shown by the dashed lines in FIG. 2. In another embodiment, heat exchange fluid inlet 30*a* may be in fluid communication with fluid flow channel 20*a* via end plate 18*a*, such that the heat exchange fluid inlet 30*a* is accessed from the side of thermal storage apparatus 10 and heat exchange fluid inlet 30*b* may be in fluid communication with fluid flow channel 20*b* via end plate 18*b*, such that the heat exchange fluid inlet 30*b* is accessed from the other side of thermal storage apparatus 10. Similarly, heat exchange fluid outlet 32*a* may be in fluid communication with fluid flow channel 20*a* via end plate 18*a*, such that the heat exchange fluid outlet 32*a* is accessed from the side of thermal storage apparatus 10 and heat exchange fluid outlet 32*b* may be in fluid communication with fluid flow channel 20*b* via end plate 18*b*, such that the heat exchange fluid outlet 32*b* is accessed from the other side of thermal storage apparatus 10.

Figure 3:
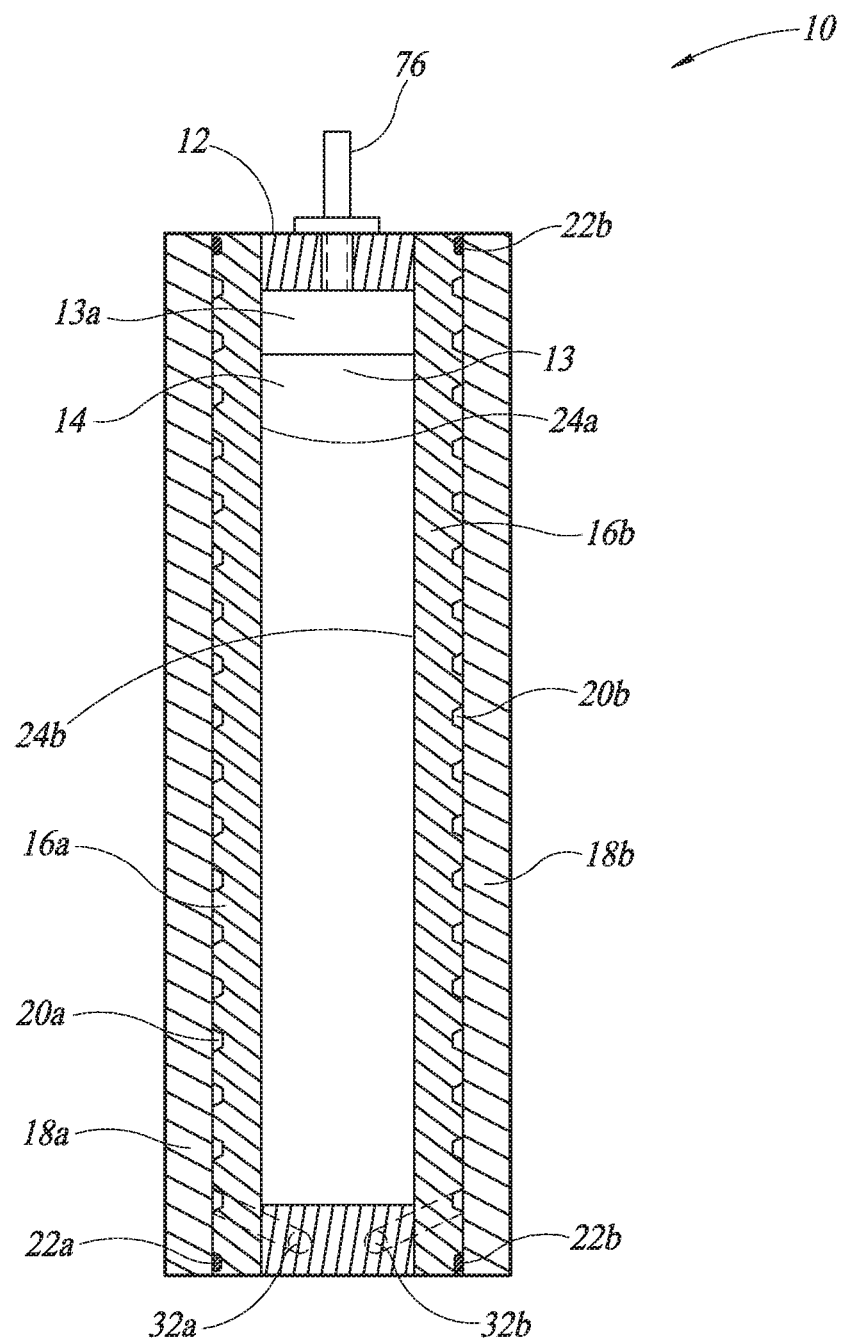
FIG. 3 is a cross-section view of the thermal energy storage apparatus of FIG. 1 from the back side according to one embodiment.

FIG. 3 is cross-sectional view of the backside of thermal energy storage apparatus 10 according to at least one illustrated embodiment. As was shown in FIG. 2, FIG. 3 shows on either side of base 12 is disposed optional film 24*a* and 24*b*. On either side of film 24*a* and 24*b* are fluid flow plates 16*a* and 16*b*. Base 12 cooperates with fluid flow plate 16*a*, with optional film 24*a* disposed between base 12 and fluid flow plate 16*a*, and base 12 cooperates with fluid flow plate 16*b*, with optional film 24*b* disposed between base 12 and fluid flow plate 16*b*, to collectively define cavity 13. Phase change material 14 is disposed in cavity 13. Phase change material 14 may not fill the entirety of cavity 13 leaving a vapour space 13*a* above the phase change material 14. Fluid flow plate 16*a* and end plate 18*a* define a fluid flow channel 20*a*. Fluid flow plate 16*a* and end plate 18*a* may be sealed by gasket or seal 22*a* to seal fluid flow channel 20*a*. Fluid flow plate 16*b* and end plate 18*b* define fluid flow channel 20*b* on the other side of base 12. Fluid flow plate 16*b* and end plate 18*b* may be sealed by gasket or seal 22*b* to seal fluid flow channel 20*b*.

Sidewall fitting 70 traverses the wall of base 12 into cavity 13 and at least partially submerged by phase change material 14. External seed crystal reservoir trigger assembly trigger assembly 72 is fixed and sealed to sidewall fitting 70 via a threaded or fused connection (weld, braze, solder, or adhesive) to isolation valve 74. Seed crystal reservoir tube 78 is fixed to the remaining port of isolation valve 74 at one end of the seed crystal reservoir tube 78 and fixed to pressure balancing port 76 at the other end of the seed crystal reservoir tube 78. A solid phase change material reserve 80 is contained within seed crystal reservoir tube 78, which is a reserve with respect to the solid phase change material contained in the cavity 13. Fluid flow plate 16*a* is in thermal communication (e.g., thermally conductive path) with phase change material 14 via film 24*a*, allowing thermal energy to conductively flow between fluid flow plate 16*a* and phase change material 14. Fluid flow plate 16*b* is in thermal communication (e.g., thermally conductive path) with phase change material 14 via film 24*b*, allowing thermal energy to conductively flow between fluid flow plate 16*b* and phase change material 14. FIG. 3 shows heat exchange fluid outlet 32*a*. Heat exchange fluid outlet 32*a* is in fluid communication with fluid flow channel 20*a* via base 12 as shown by the dashed lines in FIG. 3. FIG. 3 also shows heat exchange fluid outlet 32*b*. Heat exchange fluid outlet 32*b* is in fluid communication with fluid flow channel 20*b* via base 12 as shown by the dashed lines in FIG. 3.

Heat exchange fluid inlet 30*a* allows for the ingress of a heat exchange material 34 into fluid flow channel 20*a*. Heat exchange fluid outlet 32*a* allows for the egress of heat exchange material 34 out of fluid flow channel 20*a*. Heat exchange fluid inlet 30*b* allows for the ingress of a heat exchange material 34 into fluid flow channel 20*b*. Heat exchange fluid outlet 32*b* allows for the egress of heat exchange material 34 out of fluid flow channel 20*b*.

The relative locations of heat exchange fluid inlet 30*a* with respect to heat exchange fluid outlet 32*a*, and the relative locations of heat exchange fluid inlet 30*b* with respect to heat exchange fluid outlet 32*b*, may preferably be located diagonally from one another to promote the flow of heat exchange fluid across the bulk of the fluid flow plates 16*a* and 16*b*. Further, it may be preferable to locate the heat exchange fluid inlets 30*a* and 30*b* towards the top of thermal energy storage apparatus 10 and heat exchange fluid outlets 32*a* and 32*b* towards the bottom of thermal energy storage apparatus 10, as is explained later in this disclosure. However, the location of heat exchange fluid inlets and outlets may be positioned elsewhere and/or at other orientations.

Isolation valve 74 is operable to be in closed conformation or configuration at the unactuated or closed state, for instance sealing cavity 13 and phase change material 14 from seed crystal reservoir tube 78 and solid phase change material reserve 80. Without being tied to theory, it is believed that the closed isolation valve 74 forms a seal to inhibit the growth of solid phase change material across the isolation valve from the seed crystal reservoir tube 78 and solid phase change material reserve 80 to cavity 13 and phase change material 14. It is believed that the thermal communication (e.g., thermally conductivity) between base 12, sidewall fitting 70, and isolation valve 74 is sufficient to melt phase change material 14 contained in the port of isolation valve 74 facing or located adjacent to base 12/sidewall fitting 70. The seed crystal reservoir tube 78 remains sufficiently cool by virtue of being at a distance from cavity 13 for the solid phase change material reserve 80 to always remain solid and never become molten. This can be further assured by using a seed crystal reservoir tube 78 constructed of thermally insulating material (e.g., plastic or rubber) so that no appreciable heat transfer is gained by way of heat conduction from base 12 to sidewall fitting 70 and isolation valve 74.

Opening isolation valve 74 allows supercooled phase change material 14 to become exposed to solid phase change material reserve 80, causing supercooled phase change material 14 to solidify spontaneously, and cascading throughout phase change material 14 in cavity 13. Upon completion of the solidification of phase change material 14 in cavity 13, isolation valve 74 becomes closed so as to isolate solid phase change material reserve 80 from the subsequent thermal recharging/melting and supercooling of phase change material 14 in order to remain available to trigger solidification of phase change material 14.

In order to reliably trigger solidification by way of external seed crystal reservoir trigger assembly 72, sidewall fitting 70 and isolation valve 74 must be flooded with molten phase change material 14. Otherwise, an air obstruction or bubble inside sidewall fitting 70 and/or isolation valve 74 can inhibit supercooled phase change material 14 to come into contact with solid phase change material reserve 80 that is needed to trigger solidification of phase change material 14 when isolation valve 74 is opened. To ensure sufficient phase change material 14 flooding inside sidewall fitting 70 and isolation valve 74, seed crystal reservoir tube 78 must be vented during at least the first solidification triggering event to allow for the partial or complete displacement of the air obstruction from sidewall fitting 70 and isolation valve 74 into seed crystal reservoir tube 78, flowing through and past the solid phase change material reserve 80 which remains in close proximity to the port of isolation valve 74. Once flooded with phase change material 14 following the first solidification triggering event with venting, venting of seed crystal reservoir tube 78 can either remain indefinitely or be instead sealed.

Venting seed crystal reservoir tube 78 can be accomplished by opening the seed crystal reservoir tube 78, for example a free end/extremity of the seed crystal reservoir tube 78 that is opposite the connection to the isolation valve 74, to the atmosphere. Venting seed crystal reservoir tube 78 can be accomplished by establishing a fluid connection via fittings and/or tubes/hoses to pressure balancing port 76. In either case, venting can be sealed using either a plug/cap fitting or a closed isolation valve on the free extremity of seed crystal reservoir tube 78.

Isolation valve 74 may advantageously take the form of a ball valve so as to operate both in the presence of solid or liquid phase change material 14. Isolation valve 74 may be actuated manually or may be actuated with a solenoid, electric motor, or other mechanical or electro-mechanical motor or servo or the like to open and close the isolation valve 74.

Thermal energy storage apparatus 10 may be operated in particular states following initial set-up being: a charging state, a storage state, and a discharge state.

In set-up, cavity 13 is filled with phase change material 14 leaving a portion of cavity 13 unfilled so as to reduce the sealing pressure on seal ports, such as pressure balancing port 76, and to accommodate thermal expansion of the phase change material 14. FIG. 1 shows port 15 which may be a sealed cap or threated cap, for example, allowing for pouring in phase change material 14 or for the removal of phase change material 14 from cavity 13. Partial filling of cavity 13 with phase change material 14 is not required and complete filling may be selected by a person of ordinary skill in the art, provided thermal storage apparatus 10 is fitted with a means to accommodate an increase in volume of phase change material 14 which may occur through a phase transition. Filling must however, at least partially immerse sidewall fitting 70 and isolation valve 74 in phase change material 14. In set-up, phase change material 14 will be introduced into cavity 13, generally, in a liquid form, but may be introduced in a solid form.

In a charging state, heat exchange fluid inlets 30*a* and 30*b* are connected to an external source of heat exchange fluid. Heat exchange fluid outlets 32*a* and 32*b* may be connected to an external sink for heat exchange fluid or may be connected to the external source of heat exchange fluid to form a loop with heat exchange fluid circulating through thermal energy storage apparatus. In a charging state, heat exchange fluid is introduced into the heat exchange fluid inlets 30*a* and 30*b* which then flows via heat exchange fluid inlets 30A and 30B into fluid flow channels 20*a* and 20*b* and then out via heat exchange fluid outlets 32*a* and 32*b* back to the external source or reservoir, or to the external sink. In a charging state, heat exchange fluid is at a higher temperature than phase change material 14. As heat exchange fluid flows through fluid flow channels 20*a* and 20*b*, it imparts thermal energy to fluid flow plates 16*a* and 16*b*. As fluid flow plates 16*a* and 16*b* heat, they will in turn, thermally conductively impart thermal energy to phase change material 14, via film 24*a* and 24*b*, if such film is disposed between phase change material 14 and fluid flow plates 16*a* and 16*b*.

In a charging state, heat exchange fluid is at a temperature greater than the melting point of the phase change material 14 such that solid phase change material 14 melts or dissolves to become a liquid solution. Heat exchange fluid may receive its thermal energy from a solar thermal energy harvester, through a waste thermal energy recovery system or other means to heat the heat exchange fluid. Thus, when heated, heat exchange fluid then flows into fluid flow channels 20*a* and 20*b*, as described above, and, where heat exchange material is at a temperature greater than the temperature of the phase change material 14, thermal energy will flow across the fluid flow plates 16*a* and 16*b*, and film 24*a* and 24*b*, if used, to heat phase change material 14. Heat exchange fluid exits thermal storage apparatus 10 via the heat exchange fluid outlets 32*a* and 32*b* at a lower temperature than upon entering via heat exchange fluid inlets 30*a* and 30*b*, in a charging state. This process is continued until phase change material 14 is above the melting point of the phase change material 14, such that the phase change material 14 is liquefied, or dissolves, and at a temperature above the melting point of phase change material 14. At this point, flow of heat exchange fluid may be stopped and thermal energy storage apparatus 10 may enter the storage state.

In a charging state, it is preferable to have heat exchange fluid inlets 30*a* and 30*b* located towards the top of thermal energy storage apparatus 10 and to have heat exchange fluid outlets 32a and 32b located towards the bottom of thermal energy storage apparatus 10. Further, it is preferable to have heat exchange fluid inlets 30a and 30b located on one end of thermal energy storage apparatus 10 and to have heat exchange fluid outlets 32a and 32b located on the other end of thermal energy storage apparatus 10 such that heat exchange fluid enters towards the top front of the fluid flow plates 16a and 16b, and then travels generally diagonally downward towards the back of base 12 to achieve convective thermal transfer. However, other locations and/or orientations of heat exchange fluid inlets 30b and 30c and outlets 32a and 32b may be employed for a particular application. For example, heat exchange fluid inlets 30a and 30b may be located on the side of thermal energy storage apparatus 10 such that the heat exchange fluid inlets 30a and 30b run through end plates 18a and 18b. However, other locations and/or orientations of heat exchange fluid inlets 30a and 30b and outlets 32a and 32b may be employed for a particular application. Similarly, heat exchange fluid outlets 32a and 32b may be located on the side of thermal energy storage apparatus 10 such that the heat exchange fluid outlets 32a and 32b run through end plates 18a and 18b. With heat exchange fluid inlets 30a and 30b located towards the top and towards one side (front for example) of thermal energy storage apparatus 10 and heat exchange fluid outlets 32a and 32b located towards the opposite diagonal, towards the bottom and towards the back, for example, thermal energy from warmer heat exchange fluid entering heat exchange fluid inlets 30a and 30b at the top of thermal energy storage apparatus 10 will be imparted to the upper portion of phase change material 14. A convection current will be set up within phase change material 14 such that as colder, molten phase change material is heated, it will rise. The net effect is that there will; be a current of phase change material rising to the top, heating as it rises, and a current of heat exchange fluid flowing towards the bottom, cooling as it descends as it imparts thermal energy to the thermal energy storage apparatus 10. This countercurrent is desirable in heat exchange systems to impart greater rates of heat transfer.

When transitioning from the completion of the charging state to a storage state, phase change material 14 may then be permitted to cool and, given its nature, phase change material 14 will enter a supercooled state, below the freezing point of phase change material 14. Once phase change material 14 is in a supercooled state, thermal energy storage apparatus 10 may be stored for extended periods of time exceeding one year and may be transported for discharge in a location different from the charging location, if desired.

In a storage state, thermal energy storage apparatus 10 may be disconnected from the external source of heated heat exchange fluid, and the heat exchange fluid inlets 30a and 30b and outlets 32a and 32b may be disconnected from the external source, if desired. Heat exchange fluid may also be evacuated from the fluid flow channels 20a and 20b, if desired, or may remain in fluid flow channels 20a and 20b.

The discharge state is initiated when it is desired that thermal energy storage apparatus 10 release stored thermal energy. The discharge of thermal energy occurs when phase change material 14, maintained in a supercooled liquid state, is triggered to enter a solid state. Before triggering phase change material 14 in a supercooled liquid state to enter a solid state, heat exchange fluid should be introduced into flow channels 20a and 20b, if previously empty, and heat exchange fluid inlets 30a and 30b should be connected to a source of heat exchange fluid, and heat exchange fluid outlets 32a and 32b should be connected to a sink of heat exchange fluid, such that heat exchange fluid can impart thermal energy to the thermal mass sought to be heated. The discharge of thermal energy occurs when phase change material 14, in a supercooled liquid state, is triggered to enter a solid state. At a discharge time, isolation valve 74 is opened either by manually turning the valve handle or by having opened isolation valve 74 by operation of solenoid, electric motor or other mechanical/electromechanical actuator. It has been found that when phase change material 14 is in a supercooled liquid state and isolation valve 74 is opened, phase change material 14 is triggered to enter a solid state. Without being bound by theory, it is believed that isolation valve 74 seals solid phase change material reserve 80 from phase change material 14, enabling the supercooling of phase change material 14 by preventing unintended solidification caused by exposure to solid phase change material reserve 80. It is also believed that external seed crystal reservoir trigger assembly 72 prevents solid phase change material reserve 80 from melting by virtue of being removed from cavity 13 in base 12, so as to remain sufficiently cool at all times for solid phase change material reserve 80 to remain solid. When opening isolation valve 74, the solid phase change material reserve 80 is open to the bulk phase change material 14 in the supercooled liquid state and presents as a seed crystal upon which phase change material 14 in the supercooled liquid state crystalizes and solidifies.

As phase change material 14 transitions from the supercooled liquid state to a solid state, thermal energy is released. Heat exchange fluid in fluid flow channels 20a and 20b, at a temperature below the temperature of phase change material 14 which releases thermal energy through solidification will receive thermal energy by thermal conduction from phase change material 14 across fluid flow plates 16a and 16b and film 24a and 24b, if used. Heat exchange fluid may then be pumped or fed or otherwise motivated from fluid flow channels 20a and 20b out of thermal energy storage apparatus 10 via heat exchange fluid outlets 32a and 32b to an external sink desired to be heated. Heat exchange fluid may be reintroduced into fluid flow channels 20a and 20b via heat exchange fluid inlets 30a and 30b to replace heat exchange fluid pumped or fed or otherwise motivated out of fluid flow channels 20a and 20b. A loop of heat exchange fluid may be used to feed into fluid flow channels 20a and 20b via heat exchange fluid inlets 30a and 30b and out of fluid flow channels 20a and 20b via heat exchange fluid outlets 32a and 32b. This process may continue until thermal equilibrium is reached. Thermal energy storage apparatus 10 may then be placed back into a charging state, or may be stored in the discharged state, if desired.

The system can be operated in reverse if desired and the direction of flow of heat exchange fluid may be switched based on whether the system is in a charging state or discharge state. For example, in a charging state, heat exchange fluid may enter at heat exchange fluid inlets 30a and 30b and may exit at heat exchange fluid outlets 32A and 32B. If desired, external plumbing may be manipulated or a flow direction valve or pump may be switched so that in a discharge state, heat exchange fluid may enter at heat exchange fluid outlets 32a and 32b and may exit at heat exchange fluid inlets 30a and 30b.

Materials and method of manufacture of thermal energy storage apparatus 10 can be selected by a person of ordinary skill in the art for a particular size, volume, type of phase change material, type of heat exchange fluid, and other aspects of a particular application.

In one embodiment, phase change material 14 is comprised of sodium acetate trihydrate, with or without additional water, which has some corrosive properties as against steel or other materials. Sodium acetate trihydrate may itself not be properly classified as organic or inorganic but may be classified as comprised of organic and inorganic materials. Other possible phase change materials include organic or inorganic materials that melt in the operational temperature range and supercool or can be made to supercool and include salt hydrate inorganic phase change materials and sugar alcohol phase change material, such as xylotol, erithritol, for example. An appropriate phase change material may only be selected by a person of ordinary skill in the art.

Base 12 may be constructed from a material that has sufficient mechanical properties to ensure the structural integrity of base 12 and thermal storage apparatus 10 as a whole. Base 12 may also be manufactured from a material that has desired thermal properties and desired chemical properties. Base 12 may be manufactured from plastic such as cast and machined polypropylene. Plastic, such as polypropylene, has good mechanical properties that allows for rigid construction, when sufficiently thick, and has good chemical properties to avoid corrosion when exposed to phase change material 14. Polypropylene also has low thermal conductivity which may be preferable as it is preferentially desired for thermal energy to flow between phase change material 14 and heat exchange material located in fluid flow channels 20a and 20b, across fluid flow plates 16A and 16B. Base 12 may be made of more than one material, such steel which has good mechanical properties, partially or fully encased in polypropylene, for example, to achieve the net desired properties of base 12 as a whole. The materials and method of manufacture base 12 may be selected by the person of ordinary skill in the art for a particular application.

When used, in a particular embodiment, film 24a and 24b may be a metalized film, such as a film composed of Mylar/aluminum/polyethylene. A metalized Mylar film 24 provides a chemical barrier between phase change material 14 and fluid flow plates 16b and 16b while maintaining thermal conductivity between phase change material 14 and fluid flow plates 16a and 16b. Film 24a and 24b and may also serve as a gasket or seal to seal cavity 13 between base 12 and fluid flow plates 16a and 16b. The materials and method of manufacture for film 24a and 24b may be selected by the person of ordinary skill in the art for a particular application.

Fluid flow plates 16a and 16b may be constructed out of materials which have good thermal conductivity and good mechanical rigidity. Fluid flow plates 16a and 16b may be constructed from cast or machined aluminum alloy, such as a 6061 alloy. Fluid flow plates 16a and 16b may also be constructed from cast or machined steel or stainless steel, for example. As noted above, film 24a and 24b provides a chemical barrier between phase change material 14 and fluid flow plates 16a and 16b. However, where phase change material 14 is not corrosive to fluid flow plates 16a and 16b, film 24a and 24b may not be required. Alternatively, where phase change material 14 is corrosive to fluid flow plates 16a and 16b, film 24a and 24b may not be required, if fluid flow plates 16a and 16b are coated with a thermally conductive coating which renders fluid flow plates 16a and 16b chemically resistant to corrosion caused by phase change material 14. Fluid flow plates 16a and 16b may otherwise be bonded or laminated with a film to seal fluid flow plates 16a and 16b from phase change material 14. If a film 24a or 24b is not used, a gasket or seal may still be required to ensure cavity 13 does not leak to the external environment. Fluid flow plates 16a and 16b may be manufactured from a bonded aluminum and 302/304 stainless steel plate, for example, with the stainless steel side exposed to the phase change material 14. A thin layer of stainless steel provides corrosion resistance and thermal conductivity to the aluminum layer. Further, aluminum is less expensive than stainless steel, and a bonded aluminum stainless steel fluid flow plate may be desirable over a full stainless steel plate. Bonding of metals may be produced in a manner as is known by a person of ordinary skill in the art, including processes in the art used in the manufacture of metal stovetop cookware. The materials and method of manufacture for fluid flow plates 16a and 16b can be selected by the person of ordinary skill in the art for a particular application.

End plates 18a and 18b may be constructed out of materials which have good mechanical rigidity and low thermal conductivity, so as to avoid conduction of thermal energy to the surrounding environment. End plates 18a and 18b may be constructed from polypropylene, for example. To increase the mechanical properties of the polypropylene, for a given thickness, end plates 18a and 18b may be made of plastic encased or coated steel, or aluminum, for example, or may be constructed in a layered manner, such as a sandwich or laminate of plastic and steel. Such a combination would allow for the polypropylene side to face fluid flow channels 20a and 20b, which would allow the low thermal conductivity of the plastic to avoid thermal conduction to a steel or other metal back layer which has good mechanical properties, to achieve the net desired properties of the end plates 18a and 18b as a whole. End plates 18a and 18b may be made of the same metals as disclosed in respect of the fluid flow plates 16a and 16b above, but to reduce thermal leakage to the surrounding environment, should preferably be insulated on the outside using insulation such as ethylene propylene diene monomer foam, as an example. The materials and method of manufacture of end plates 18a and 18b may be selected by the person of ordinary skill in the art for a particular application.

Isolation valve 74 is operable to be in a closed conformation at the resting unactuated state such that the ports of isolation valve 74 are sealed from one another. The valve body materials for isolation valve 74 may be selected from materials that have appropriate chemical resistance to phase change material 14 and thermally conductive (i.e., relatively high level of thermal conductivity, e.g., metals); whereas valve actuator/seal materials for isolation valve 74 may be selected from materials that have appropriate chemical resistance to phase change material 14 and able to form a seal between phase change material 14 and solid phase change material reserve 80. Moreover, isolation valve 74 actuator/seal is constructed so as to permit actuation to return to a closed conformation in the presence of solid phase change material as well as the return actuation generating sufficient torque to return isolation valve 74 to a closed conformation. Isolation valve 74 with zero (0) differential pressure required to produce a seal when closed is preferred for applications involving the transportation of the thermal energy storage apparatus 10, giving the isolation valve 74 resistance to actuator/seal displacement caused by transportation shock and therefore resistance to risks of unintended solidification trigger during transport. For example, isolation valve 74 body may be constructed from brass and actuator/seal may be constructed from brass, PTFE, and EPDM O-rings, and may be commercially purchased as item #6442 from Caleffi North America Inc., Milwaukee, Wis. A person of ordinary skill in the art may select the body material and actuator/seal materials for isolation valve 74 for a particular application, but suitable body materials include type 300 series stainless steels, brass, copper, bronze, and corrosion resistant nickel alloys including Incoloy®, Hastaloy®, for example, while suitable actuator/seal materials include type 300 series stainless steels, brass, copper, bronze, corrosion resistant nickel alloys including Incoloy® nickel-based superalloys from Special Metals Corporation, Hastaloy® nickel-based alloys developed by Haynes International, Inc., for example, plastics including polypropylene, polyethylene, and PTFE, for example, and elastomers including EPDM, for example. A person of ordinary skill in the art may also select the valve body style for isolation valve 74, but the recommended construction is that of full-port ball valve.

The combination of end plate 18a, gasket or sealant 22b, fluid flow plate 16b, film 24b, and base 12 on one side, and on the other side, base 12, film 24a, fluid flow plate 16a, gasket or sealant 22a, and end plate 18a are held together under compression through one or more compression fasteners 50. Compression fasteners 50 may be a series of through bolts which engage or penetrate the perimeter of base 12, fluid flow plates 16a and 16b, and end plate 18a and 18b, and other elements, as may be required, which are then secured with nuts to apply a general compression force across the elements, as shown in FIG. 1 (where only one instance of compression fastener 50 is called out for clarity). Alternatively, bands (e.g., metal band, spring steel band) may circumscribe thermal energy storage apparatus 10 to apply a general compression force across the respective elements of thermal storage apparatus 10. As another example, guiding rods or other means may be employed to line up the various elements of thermal storage apparatus 10 and thermal storage apparatus 10 may be compressed and secured by an external bolted end-plate assembly as is used for commercial plate-and-frame heat exchangers, for example. The materials and method of manufacture of compression fastener(s) 50 may be selected by the person of ordinary skill in the art for a particular application.

Figure 4:
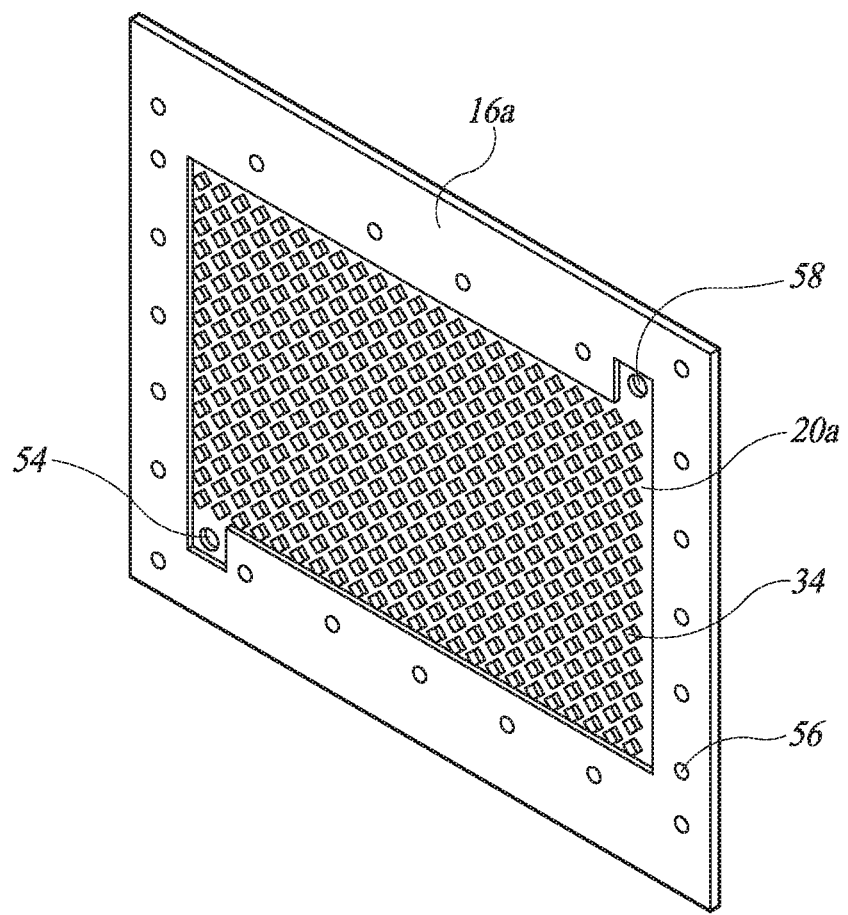
FIG. 4 is a perspective view of a fluid flow plate of the thermal energy storage apparatus of FIG. 1 according to at least one illustrated embodiment.

FIG. 4 shows a fluid flow plate 16a according to at least one illustrated embodiment. FIG. 4 shows fluid flow plate 16a with fluid outlet 54 and fluid inlet 58 with flow directors 34 machined, molded or cast, or set by any suitable means, into the surface of fluid flow channel 20a. Fluid flow channel 20a is defined by the cooperation of fluid flow plate 16a and end plate 18a (not shown in FIG. 4). Fluid flow plate 16b, in one embodiment, as shown in FIGS. 1, 2, and 3 may be a mirror image of fluid flow plate 16a, shown in FIG. 4. As shown in FIG. 1, compression fastener(s) 50 can include a series of through bolts. To allow for such through bolts, fluid flow plate 16a has a series of perimeter positioned holes 56 drilled or otherwise disposed in fluid flow plate 16a, such that the threaded action of nuts on one or more end of such through bolts will apply a compression force to the particular elements of the thermal energy storage apparatus 10. The nuts and ends of through bolts are depicted in FIG. 1 as compression fastener(s) 50.

Flow directors 34 (FIG. 4) within fluid flow channel 20a (and fluid flow channel 20b, not shown) redirect the flow of heat exchange fluid as it flows across the fluid flow plates, 16a and 16b, respectively, as heat exchange fluid passes from heat exchange inlet 30a to heat exchange fluid outlet 32a or from heat exchange inlet 30b to heat exchange fluid outlet 32b (or vice-versa if the system is operated in reverse, if desired) in the case of fluid flow channel 20b. The flow directors 34 assist in ensuring heat exchange fluid engages with the available surface of fluid flow plate 16a (and 16b not shown), enhanced by the additional surface area available on the face or faces of flow directors 34, within fluid flow channels 20a and 20b to increase the conduction of thermal energy between phase change material 14 and heat exchange fluid. Flow directors 34 may be diamond-shaped features, as shown in the embodiment in FIG. 4, but may also be selected by a person of ordinary skill in the art given the particular conditions or requirements of a particular system.

For example, flow directors 34 may contact end plates 18a or 18b such that the heat exchange fluid must pass around flow directors 34. As another example, flow directors 34 may not contact end plates 18a or 18b such that the heat exchange fluid may pass around and over flow directors 34. As another example, fluid flow plates 16a and 16b may have one or more directors that is a channel, are channels, or are channel like which may be continuous or interrupted. A person of ordinary skill in the art may select the nature of any given the particular conditions or requirements of a particular system, including whether laminar flow or turbulent flow is desired, the location of heat exchange fluid inlets 30a and 30b, heat exchange fluid outlets 32a and 32b, other factors, including the general shape of the thermal energy storage apparatus 10 as a whole. Such flow directors 34 may be features of fluid flow plates 16a and 16b, or end plates 20a and 20b, or both fluid flow plates 16a and 16b and end plates 20a and 20b such that the cooperation of fluid flow plates 16a and 16b and end plates 20a and 20b define flow directors 34.

Sidewall fitting 70 may consist a welded, soldered, adhered, or brazed fluid port or a gasketted and mechanically fastened fluid port fitting affixed and traversing the boundary of base 12. Alternatively, a fluid port may be machined or molded into the boundary of base 12. Sidewall fitting 70 should be made of thermally conductive materials, such as metals and their alloys, and should possess a large surface area for heat transfer inside cavity 13 (inclusive of base 12 if bonded to sidewall fitting 70) in comparison to its solid wall cross-section externally from base 12. For example, a mechanically fastened sidewall fitting 70 may be constructed from 300 series stainless steel and sealed to base 12 using an EPDM gasket, and may be commercially purchased as item #35K31 from McMaster Carr, Aurora, Ohio A person of ordinary skill in the art may select the materials for sidewall fitting 70 for a particular application.

Seed crystal reservoir tube 78 may be constructed of extruded tubing or hosing, cast piping, molded channel, or machined channel, so as to form a channel cavity in which to contain the solid phase change material reserve 80. Seed crystal reservoir tube 78 must be joined to the port of isolation valve 74 to form a seal. The remaining extremity of seed crystal reservoir tube 78 can either be sealed using a plug/cap fitting or isolation valve, or joined to pressure balancing port 76 by way of a fitting or isolation valve. Seed crystal reservoir tube 78 may be preferably constructed of thermally insulating material and must be able to withstand the chemical or corrosive effects of the phase change 14. The materials and method of manufacture of seed crystal reservoir tube 78 may be selected by the person of ordinary skill in the art for a particular application.

Optionally, heat exchange fluid inlets 30a and 30b may be located in base 12 and may traverse a portion of base 12 before turning and entering fluid flow channels 20a and 20b. Similarly, heat exchange fluid outlets 32a and 32b may be located in base 12 such that heat exchange fluid exits fluid flow channels 20a and 20b and then traverses a portion of base 12 before exiting the thermal energy storage apparatus 10 at heat exchange fluid outlets 32a and 32b.

As phase change material 14 solidifies, it condenses and becomes denser, as compared to phase change material 14 in the liquid state. In a charging state, thermal energy is supplied to phase change material 14 from heat exchange fluid in fluid flow channels 20a and 20b. As phase change material 14 transitions from a solid state to a liquid state, any remaining solid phase change material 14 may sink to the bottom of cavity 13. As such, it may be preferable to apply more thermal energy to the bottom of cavity 13 to liquefy any sinking solid phase change material 14 although such a configuration may lead to concentration of phase change material solute towards the bottom of cavity 13, which may lead to the creation of an inhomogeneous solid phase change material 14, such as anhydrous/hydrous sodium acetate, which may lead to auto-nucleation, which is not desired.

To avoid undesirable levels of concentration of solute, a mechanical mixer may be employed, such as a rotating paddle wheel, which may be extant within cavity 13 and operated via a port, for example. As such, configuring base 12 to house heat exchange fluid inlets 30a and 30b and heat exchange fluid outlets 32a and 32b and configuring base 12 such that heat exchange fluid inlets 30a and 30b or heat exchange fluid outlets 32a and 32b traverse a lower portion of base 12 before turning to or turning from fluid flow channels 20a or 20b would provide additional thermal energy to the bottom of base 12 and the bottom of cavity 13 to heat sunken solid phase change material 14. As such, it may be preferential to configure base 12 so as to have a more thermally conductive bottom portion to allow for the conduction of thermal energy as described above, or that such elements may be positioned towards the upper surface of the bottom of base 12 to improve heat transfer, provided there is sufficient material between such channels and the upper surface of the bottom of base 12 to prevent a leak or rupture at all operating conditions (temperature and pressure) of thermal storage apparatus 10. It is advantageous for base 12 to be otherwise insulated or insulating to minimize thermal losses to the external environment. Base 12 may be generally circular, square, rectangular, or other shape, selected by a person of ordinary skill in the art.

In one embodiment, thermal energy storage apparatus 10 may be generally configured to remain in the upright orientation shown in FIG. 1. With this orientation, pressure balancing port 76 located on the upper surface of base 12 may only need to be configured to prevent the egress of vapour of phase change material 14, as compared to being configured to prevent the egress of liquid phase change material 14. However, if phase change material 14 substantially fills cavity 13, thermal expansion of phase change material 14 at elevated temperatures may cause phase change material 14 to expand into port 15 or pressure balancing port 76, and such ports may require sealing against pressure from liquid phase change material 14.

In at least one embodiment, flow channel 20a may be sealed through a gasket or sealant 22a such that the fluid flow channel 20a is sealed from the external environment. Flow channel 20b may be sealed through a gasket or sealant 22b such that the fluid flow channel 20b is sealed from the external environment. In another embodiment, gasket or sealant 22a and 22b may not be required if tolerances of fluid flow plate and end plate allow for a leak free joint, or where fluid flow plate is otherwise sealed to end plate or by an adhesive, or by brazing or welding, for example. Suitable materials for gasket or sealant 22a and 22b for a particular application may, for example, include silicone rubber, nitrile rubber, latex rubber (depending on use with glycol or not), and butyl rubber.

Figure 5:
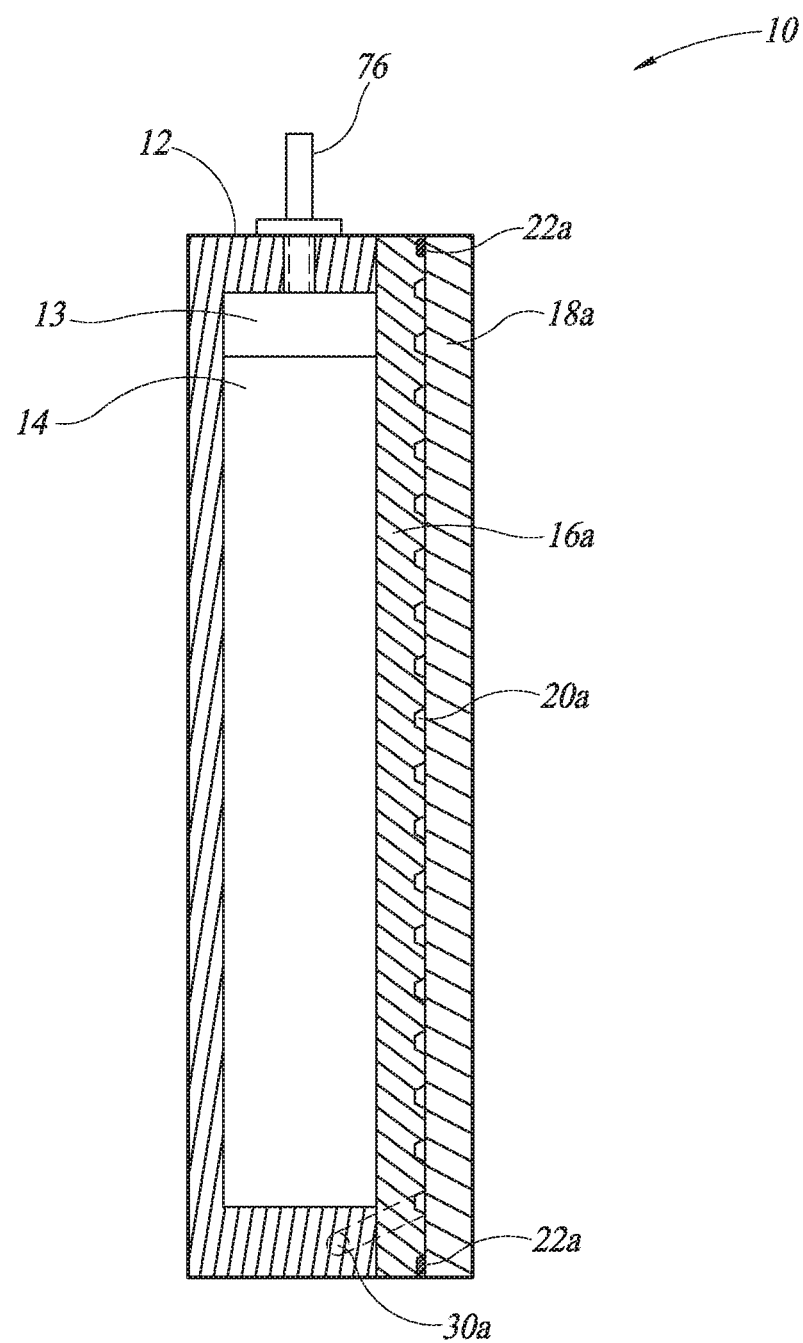
FIG. 5 is a cross-section view of a thermal energy storage apparatus from a front side thereof according to at least one illustrated embodiment.

Thermal energy storage apparatus 10 is shown in FIGS. 1, 2, and 3 as a two sided apparatus with a general bilateral symmetry. In another illustrated embodiment, thermal energy storage apparatus 10 may be a one sided apparatus, with fluid flow channel on one side only. FIG. 5 shows a one-sided apparatus in cross section, according to at least one illustrated embodiment. As shown in FIG. 5, base 12 cooperates with fluid flow plate 16a to define cavity 13 in which phase change material 14 is located. Phase change material 14 may not fill the entirety of cavity 13 leaving a vapour space 13a above the phase change material 14. Fluid flow plate 16a and an end plate 18a define a fluid flow channel 20a, where fluid flow plate 16a has sufficient thermal conductivity to be in thermal communication (e.g., thermally conductive) with phase change material 14 and to allow thermal energy to flow between fluid flow plate 16A and phase change material 14. As shown in FIG. 5, fluid flow plate 16a and end plate 18a, which define fluid flow channel 20a, may be sealed through a gasket or sealant 22a such that the fluid flow channel 20a is sealed from the external environment. Gasket or sealant 22a may not be required if tolerances of fluid flow plate 16a and end plate 18a allow for a leak free joint. In this embodiment, film 24a may be optimally disposed between fluid flow plate 16a and base 12.

Figure 6A:
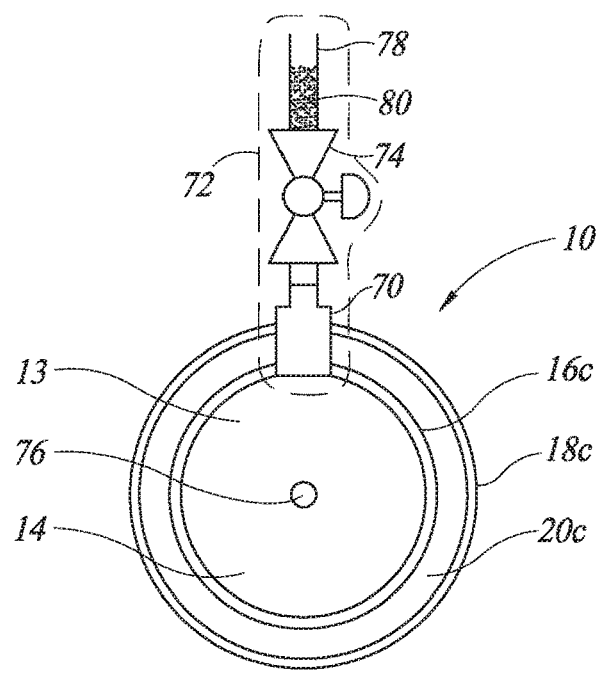
FIG. 6A is a cross-section view of a cylindrical thermal energy storage apparatus taken along a longitudinal axis thereof according to at least one illustrated embodiment.

The shape of thermal energy storage apparatus 10 may be configured by a person of ordinary skill in the art however, it has been found that a greater surface area of fluid flow plates to volume of cavity ratio allows for greater conduction of thermal energy between phase change material and heat exchange fluid. In at least one illustrated embodiment, thermal energy storage apparatus 10 may be generally cylindrical in shape, including for example, a circular cylinder shape. A cross-section of a circular cylindrical shaped thermal energy storage apparatus 10 is depicted in FIG. 6A. FIG. 6A shows the cylindrical thermal energy storage apparatus 10 with cavity 13, external seed crystal reservoir trigger assembly 72, phase change material 14 within cavity 13, a cylindrical fluid flow plate 16c and a cylindrical end plate 18c. The cylindrical fluid flow plate 16c and a cylindrical end plate 18c define the cylindrical fluid flow channel 20c. In this embodiment, base 12 may be comprised of end caps that secure and further cooperate with the above elements to define cavity 13 and fluid flow channel 20c. Inlets and outlets may be included within such end caps. For example, a base 12 end cap component may be a machined cylindrical block with machined cylindrical channels into which cylindrical fluid flow plate 16c and a cylindrical end plate 18c sit or may be cylindrical ridges which abut cylindrical fluid flow plate 16c and a cylindrical end plate 18c. The end caps and fluid flow plate 16c are collectively a housing. Seals may be employed as required.

Figure 6B:
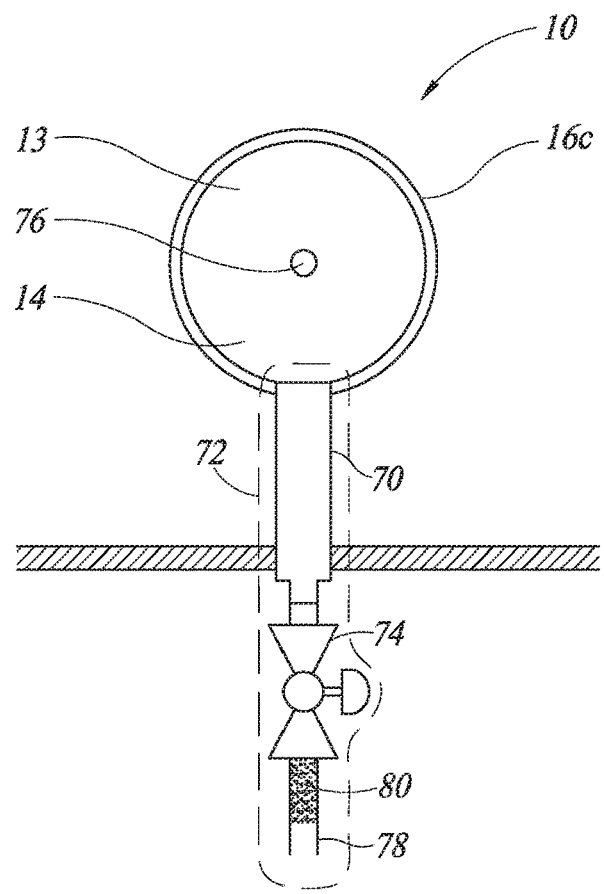
FIG. 6B is a cross-section view of a cylindrical thermal energy storage apparatus taken along a longitudinal axis thereof according to at least another illustrated embodiment.

FIG. 6B shows a cross-section of a thermal energy storage apparatus 10 according to another embodiment. In this embodiment, the cavity is defined by the cylindrical wall fluid flow plate 16c and the end caps, not shown. In this embodiment, the thermal storage apparatus sits within a bath of heat exchange fluid, such as may be found in a shell and tube heat exchanger.

Thermal storage apparatus 10 may optionally include more than one external seed crystal reservoir trigger assembly 72 affixed to base 12, each at least partially immersed within phase change material 14. Generally, the more there are external seed crystal reservoirs, the greater the probability that opening their respective isolation valves 74 will expose phase change material 14 to solid phase change material 80, triggering the solidification of phase change material 14. Further, with more than one external seed crystal reservoir trigger assembly 72 affixed to base 12, each at least partially submerged within phase change material 14, where each is triggered/opened at or near the same time, the greater the speed with which phase change material 14 may release thermal energy as it transitions from a supercooled liquid to a solid.

A thermocouple or thermocouples or other temperature sensors may be introduced into cavity 13, or may be extant within cavity 13 to inform operational systems as to when either thermal equilibrium or supercooling is reached, or when other thresholds are reached, which may trigger the start or cessation of a pump or other mechanism motivating heat transfer material, or may trigger the start or cessation of a mixing element, or for other aspects of operation such as solidification triggering. Such temperature sensors may enter the cavity 13 through base 12, for example, and may be sealed by compression fittings or by other means described herein.

Figure 7A:
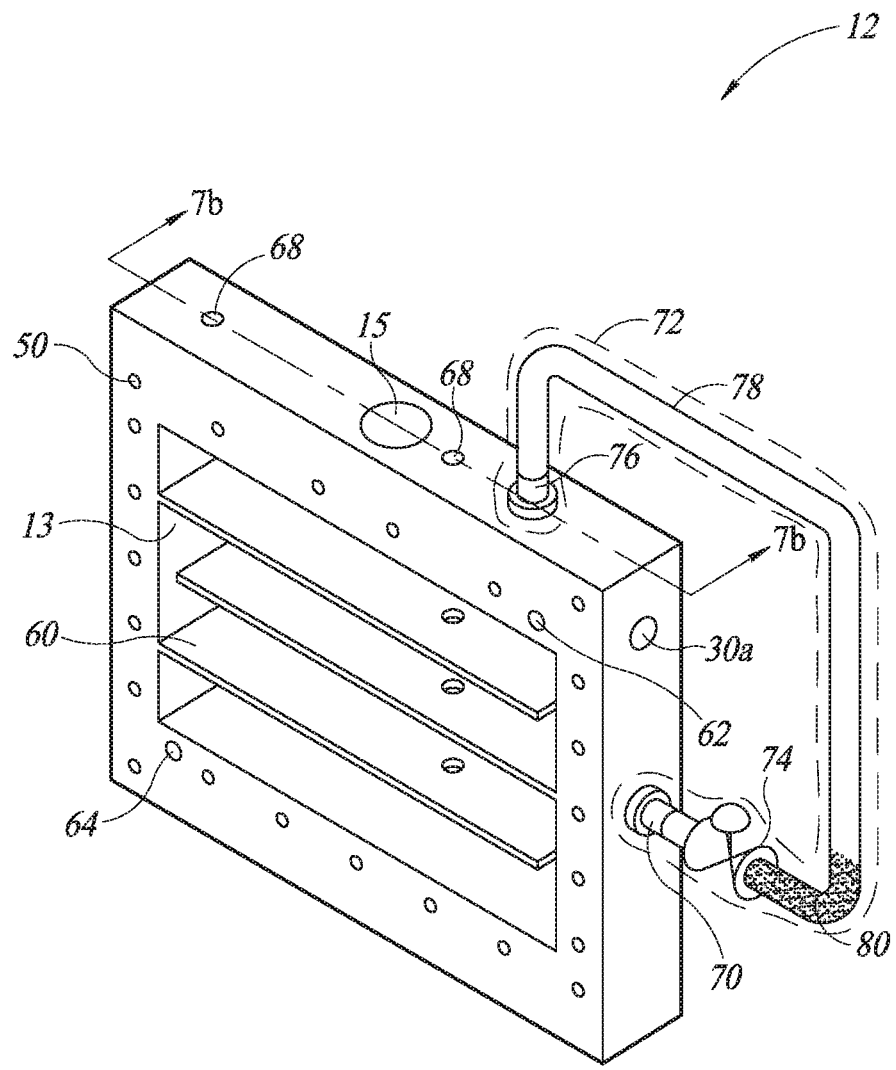
FIG. 7A is a perspective view of base of a thermal energy storage apparatus, the base fitted with baffles according to at least one illustrated embodiment.

Cavity 13 may be a single cavity, may be comprised of a number of subcavities, or may be a single cavity fitted with baffles. FIG. 7A depicts a perspective view of base 12 fitted with baffles 60 (only one called out for clarity of the figure), without phase change material 14 filled within cavity 13. FIG. 7A shows port 15. FIG. 7A shows holes drilled or otherwise located within base 12 as part of compression fastener(s) or fittings 50, or to permit the passage of bolts, for example. FIG. 7A also shows base 12, and baffles 60 configured with additional ports or passages 68 to allow for the addition of thermocouples, if desired. FIG. 7A also shows heat exchange fluid inlet 30a, which then turns within base 12 and is configured to enter the fluid flow channel (not shown) via port 62. Similarly, heat exchange fluid would exit the fluid flow channel via port 64 which would then turn and exit the fluid flow outlet 32a (shown in FIG. 7B). In at least one embodiment, the fluid flow inlet may split within base 12 and turn and feed fluid flow channels on both sides of base 12. In at least one embodiment, the fluid flow outlet may split within base 12 such that fluid flow channels on both sides of base 12 feed the fluid flow outlet.

Figure 7B:
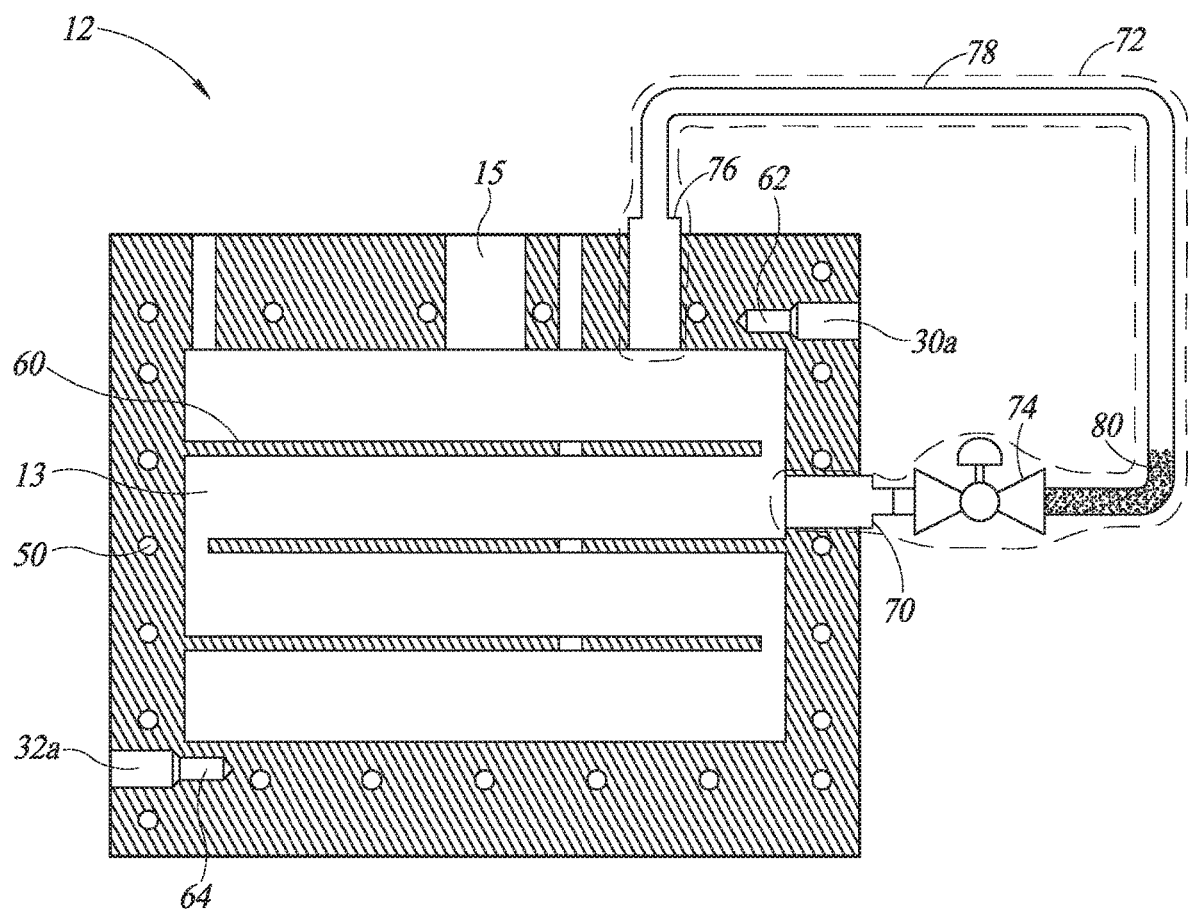
FIG. 7B is a cross-section view of base fitted with baffles of FIG. 7A, according to at least one illustrated embodiment.

FIG. 7B shows a cross sectional view of base 12 fitted with baffles 60 (only one called out for clarity of the figure), without phase change material 14 filled within cavity 13. FIG. 7B shows port 15. FIG. 7B shows holes drilled or otherwise located within base 12 as part of compression fastener(s) or fittings 50, or to permit the passage of bolts, for example. FIG. 7B also shows base 12, and baffles 60 configured with additional ports or passages to allow for the addition of thermocouples, if desired. FIG. 7B also shows heat exchange fluid inlet 30a, which then turns within base 12 and is configured to enter the fluid flow channel (not shown) via port 62. Similarly, heat exchange fluid would exit the fluid flow channel via port 64 which would then turn and exit the fluid flow outlet 32a.

As can be seen in on example in FIG. 7B, baffles 60 do not traverse the entirety of cavity 13, so as to allow for filling of cavity 13 with phase change material via the single port 15. In another embodiment, baffles 60 may traverse cavity 13, but may have holes or apertures for filling of cavity 13 with phase change material via the single port 15. In another embodiment, baffles 60 may traverse cavity 13 such that cavity 13 effectively becomes a plurality of cavities, each requiring a port for filling, if filling occurs after assembly.

Baffles 60 may be in any conformation, as selected by a person of ordinary skill in the art, provided they have some horizontal component, as compared to the direction of gravity to combat stratification of the phase change material 14 by preventing much of the solid phase change material 14 from sinking to the bottom of the cavity 13 during melting. When arranged vertically, baffles 60 may assist in the transfer of heat from phase change material 14 to fluid flow plates 16a and 16a. Baffles 60 may or may not transverse the entirety of cavity 13, but to permit the filling of the entirety of cavity 13 from a single filling port, baffles should not traverse the entirety of cavity 13, or should be fitted with apertures to permit the flow of phase change material 14 around or through baffles 60. Baffles 60 may also assist heat transfer from the phase change material 14 to fluid flow plates as baffles 60 may be constructed of thermally conductive materials, and sealed or coated as described herein Phase change material 14 may be any material capable of being in a liquid or solid state and capable of being supercooled in a liquid state. Phase change material 14 may be sodium acetate trihydrate with or without additional water, for example, provided the phase transition temperatures and other properties of the phase change material 14 do not exceed the operating temperature limits of the materials of construction of the other elements of the thermal energy storage apparatus 10. The preferable phase change material may be selected by a person of ordinary skill in the art for a particular application based on the teachings herein.

Figure 8:
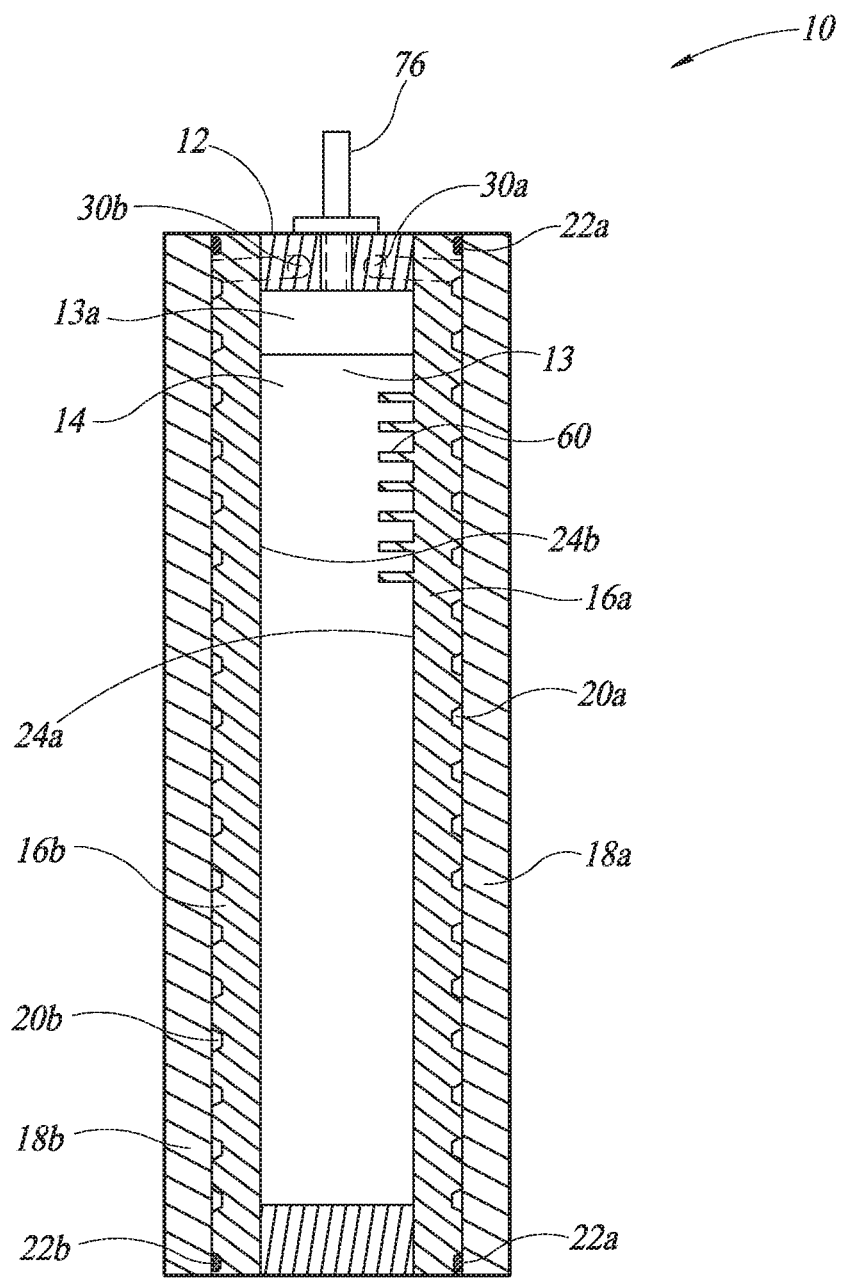
FIG. 8 is a cross-section view of a thermal energy storage apparatus from the front side according to at least one illustrated embodiment.

FIG. 8 shows baffles 60 that are in thermal communication (e.g., thermally conductive) with fluid flow plates 16a or 16b and with phase change material 14. Only one baffle 60 is called out in FIG. 8, for clarity, and baffles 60 are only shown on one portion of fluid flow plate 16a, for clarity. However, baffles 60 may be arranged on any part of fluid flow plate 16a or 16B and may be generally uniformly distributed across such fluid flow plates. Baffles 60 may be arranged generally horizontally, or generally vertically, or at an angle selected by a person of ordinary skill in the art. Generally vertically arranged fins may be preferable as they may be able to infiltrate the cavity 13 without interfering with elements such as a thermocouple, if employed, as baffles 60 shown as generally horizontal fins may have to be shorter or have ports to allow for the passage of elements such as a thermocouple, if employed. Baffles 60, for example in the form of thermally conductive fins or pins may be fixed to the cavity-facing sides of the fluid flow plates 16a or 16b or may be machined integral elements of fluid flow plates 16a or 16b. However, the use of such baffles 62 may make the use of film 24a or 24b more difficult to implement. As such, the coated fluid flow plates, as described above, or corrosion resistant fluid flow plates (e.g., stainless steel) sealed to base 12 without the use of film 24a or 24b, may be preferable. In another embodiment, thermally conductive material may be distributed throughout cavity 13 such that it is in thermal communication (e.g., thermally conductive) with both phase change material 14 and fluid flow plates fluid flow plate 16a or 16b, to enhance the thermal transfer between phase change material and fluid flow plates 16a or 16b. Such thermally conductive material may include metallic packing material, metallic foam or wool, or a graphite composite, for example. Such material may be fixed or abutted to a fluid flow plate to ensure thermal communication, and where loose packing material is selected, for example, then the conductivity is generally determined by the orientation and packing of the material such that there may be at least one pathway of thermal communication from the material to a fluid flow plates, such that the majority of the material is in some manner in thermal communication with the fluid flow plates.

Figure 9:
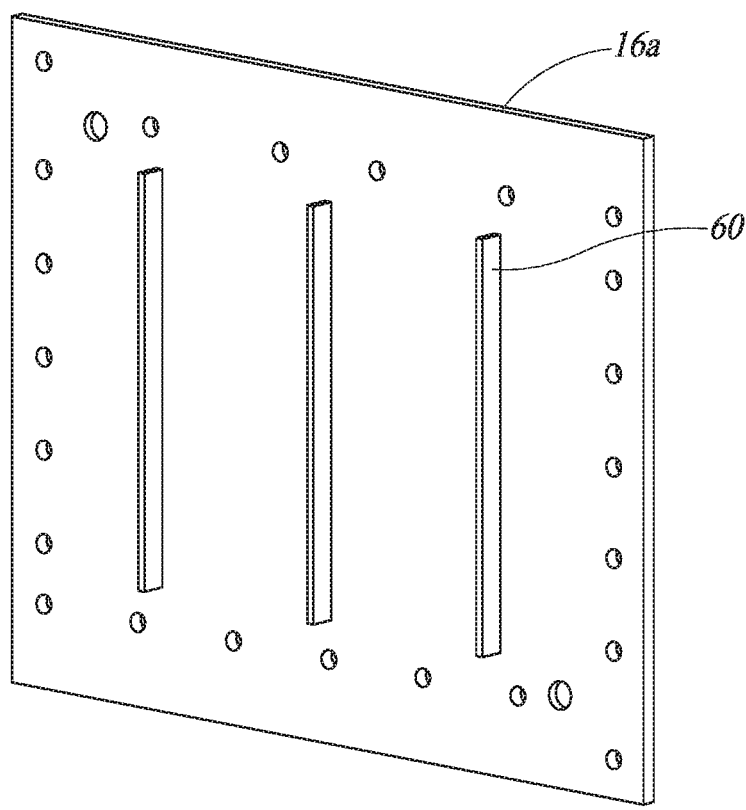
FIG. 9 is a perspective view of a fluid flow plate of a thermal energy storage apparatus, the fluid flow plate having a number of vertically oriented baffles, according to one embodiment.

FIG. 9 shows a perspective view of a fluid flow plate 16a with baffles 60 as vertically oriented fins. FIG. 9 shows the side of fluid flow plate 16a facing cavity 13. Only one instance of baffles 60 is called out in FIG. 9, for clarity.

Figure 10:
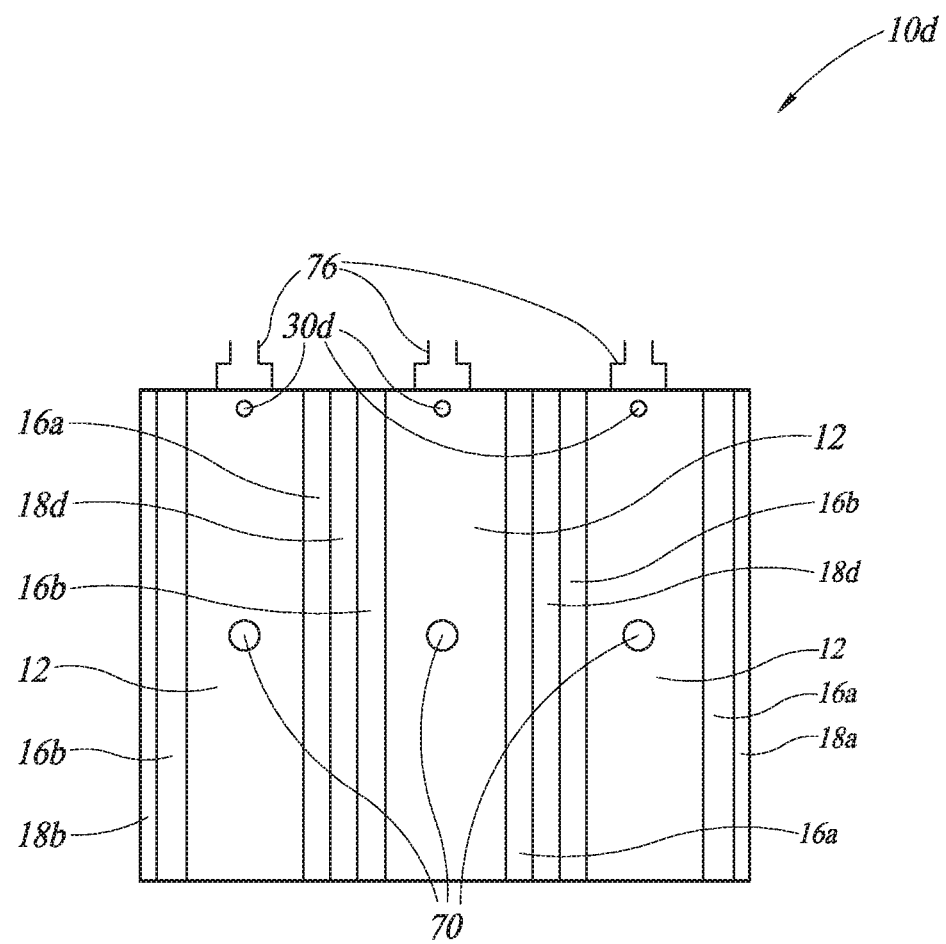
FIG. 10 is a cross-section view of a stacked thermal energy storage apparatus from the front side according to at least one illustrated embodiment.

FIG. 10 is a cross-section view of a stacked thermal energy storage apparatus from the front side according to one embodiment. FIG. 10 shows a stack configuration of a thermal energy storage apparatus 10, comprised of a plurality of bases (three shown in FIG. 10) with associated fluid flow plates and end plates, to complete a stacked arrangement of unit cells to comprise a stacked thermal energy storage apparatus 10d. Going from left to right, the stacked thermal energy storage apparatus 10d shows end plate 18b, a fluid flow plate 16b and base 12. On the right hand side of the left hand base 12, is disposed a fluid flow plate 16a, a central end plate 18d and then fluid flow plate 16b. Continuing on, is another base 12, a fluid flow plate 16a, a central end plate 18d, fluid flow plate 16b, base 12, fluid flow plate 16a and end plate 18a.

The stacked thermal energy storage apparatus 10d is configured such that the base units share the central end plates 18d. Also in this configuration, but not shown, compression fastener(s) or fittings 50 may compress the entire stacked thermal energy storage apparatus 10d with one such compression fastener or fitting. For example, compression fastener or fitting comprised of through bolts would run through the elements listed above and compress the thermal energy storage apparatus 10d stack. Also shown in FIG. 10 is a single heat exchange inlet port 30d for each base 12 where heat exchange fluid enters base 12 via heat exchange inlet port 30d which then traverses a portion of base 12 before turning and entering the fluid flow plates 16a and 16b on either side of the particular base 12. Seals and films may be employed in such a stacked thermal energy storage apparatus 10d, as is described above, but are not shown for clarity.

Further, the number of bases 12 within a single stacked thermal energy storage apparatus may be selected by a person of ordinary skill in the art for a particular application. Stacked thermal energy storage apparatus may be configured such that each base unit cell operates independently, where it is preferable that central end plates 18d are thermally insulating to thermally isolate the adjoining base unit cells or stacked thermal energy storage apparatus may be configured such that the base unit cells operate collectively, where it is not required that central end plates 18d are thermally insulating.

Figure 11:
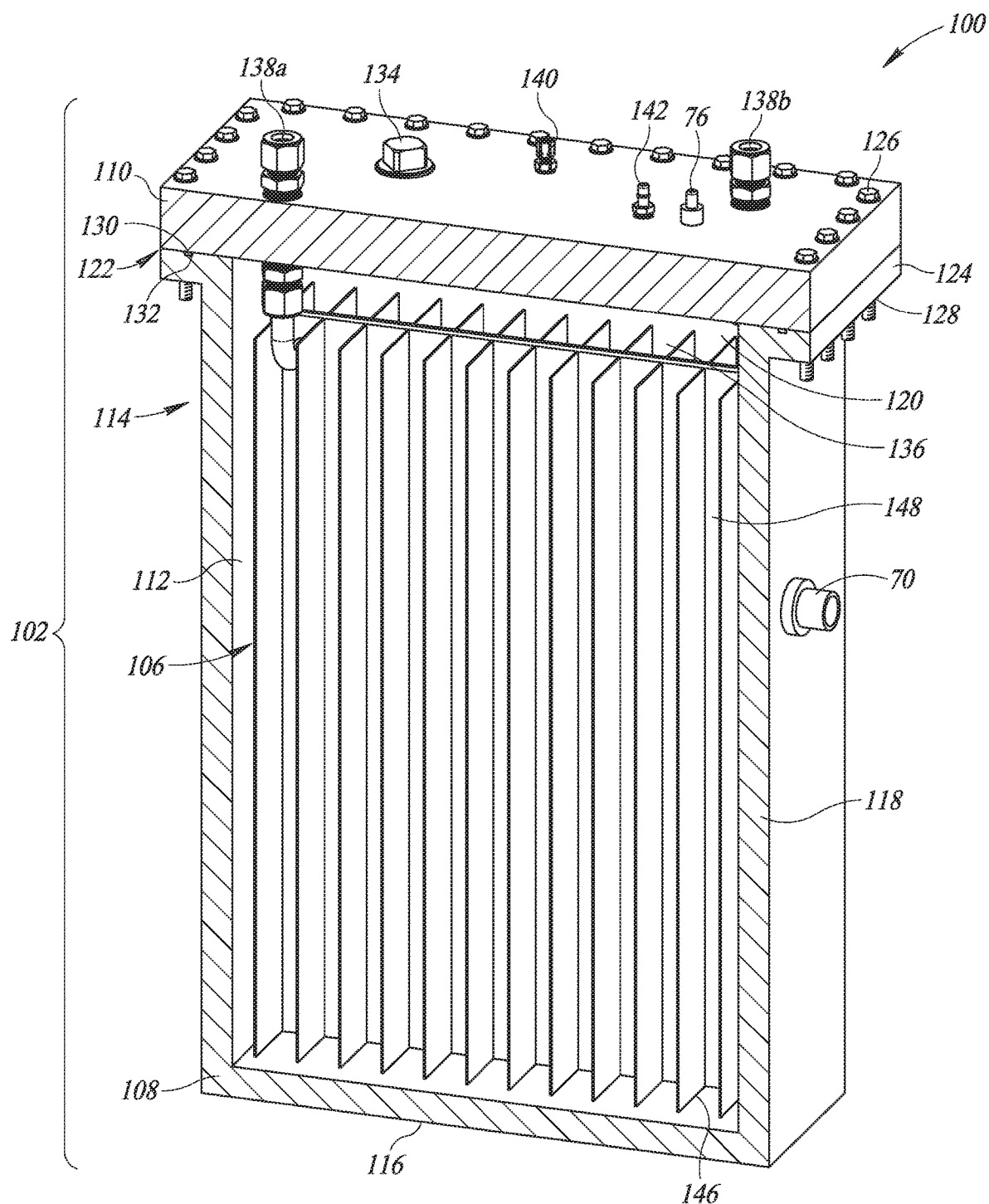
FIG. 11 is a first perspective cross-section view of a thermal energy storage apparatus taken along a first plane, having housing composed of a unitary body and a cover plate, the cover plate fixable to the unitary body to seal an interior of the housing from an exterior thereof, and a finned plate heat exchanger positioned in the interior of the housing with a set of vertically extending fins, according to one embodiment.
Figure 12:
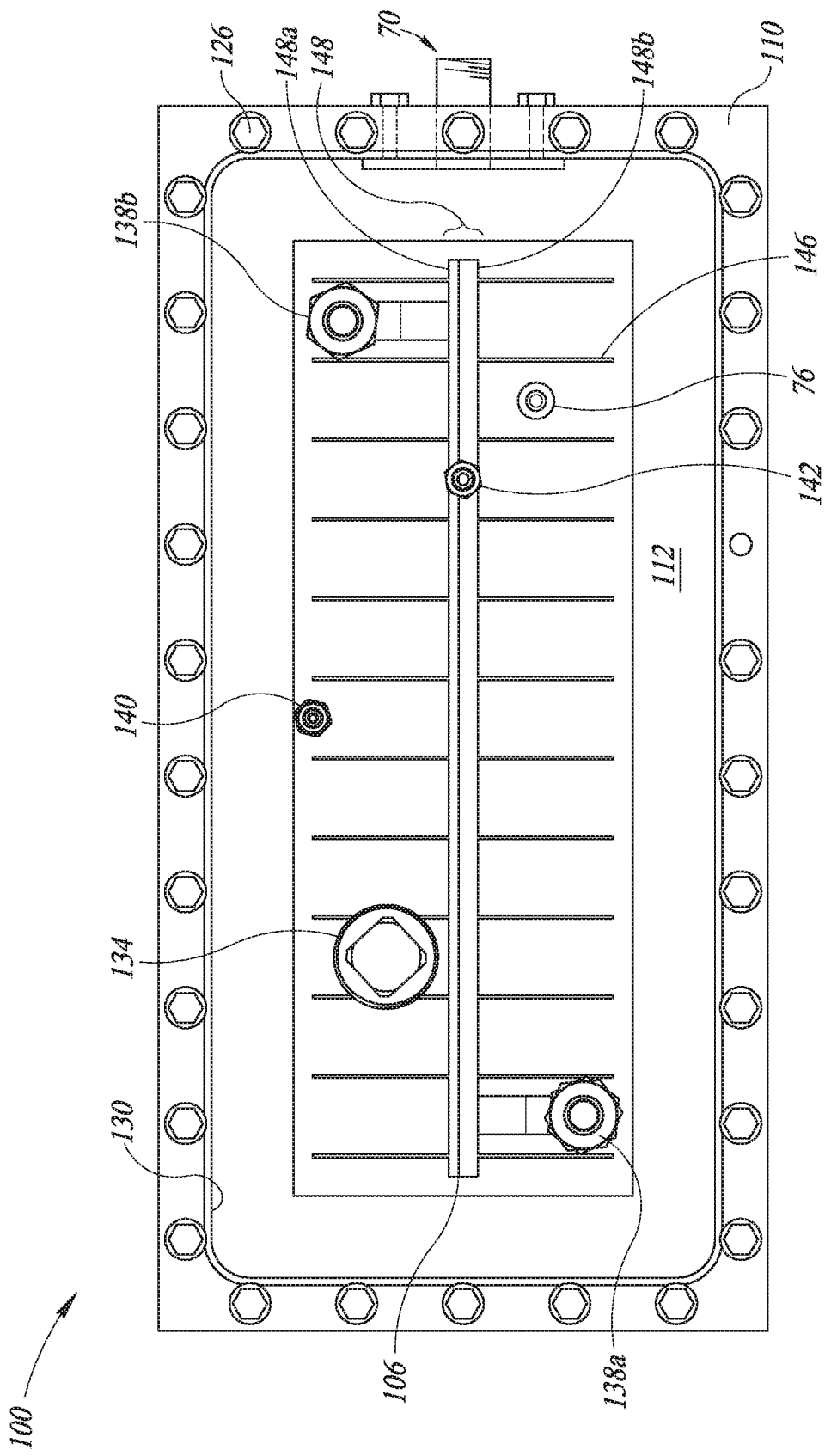
FIG. 12 is a top plane view of the thermal energy storage apparatus of FIG. 11 with the cover illustrated as transparent to better illustrate an internal structure of the thermal energy storage apparatus.
Figure 13:
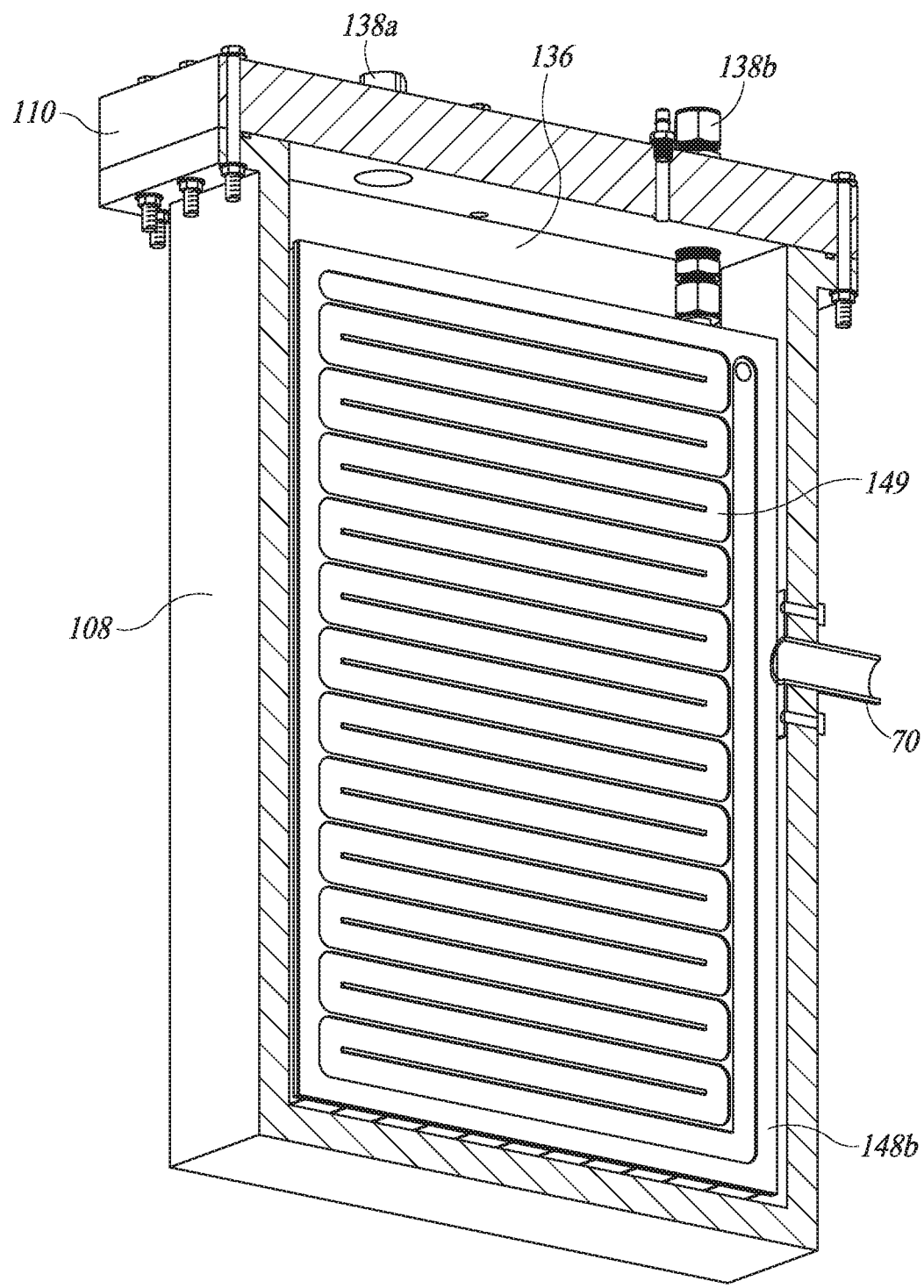
FIG. 13 is a second perspective cross-section view of the thermal energy storage apparatus of FIG. 11, taken along a second plane.

FIGS. 11, 12 and 13 show a thermal energy storage apparatus 100, according to at least one illustrated embodiment. The thermal energy storage apparatus 100 comprises a housing 102 and a heat exchanger 106. The housing 102 is composed of a unitary body 108 and a cover plate 110.

The unitary body 108, which can be denominated as a bucket, is preferably a unitary (i.e., single piece construction), including a number of walls that delineate an interior or cavity 112 from an exterior 114 of the unitary body 108. The unitary body 108 preferably comprises a non-reactive material, for example a plastic, for instance a thermoplastic (e.g., polypropylene, high density polyethylene (HDPE)) or a thermosetting plastic, which may or may not take the form of a reinforced plastic material, for instance a resin reinforced with fibrous material (e.g., carbon fiber, fiberglass). The unitary body 108 can be formed via various molding techniques, for example injection molding, reaction injection molding, cast molding, thermoforming, or compression molding. Alternatively, the unitary body 108 can comprise other materials, for example various metals.

The unitary body 108 is preferably completely sealed at a bottom 116 thereof, and along any side edges 118 (only one called out) thereof. Preferably, the unitary body 108 has only a single opening 120, located at a top 122 thereof, to provide access to the interior or cavity 112 during manufacture or assembly of the thermal energy storage apparatus 100. The unitary body 108 may include a peripheral flange 124 about the top 122 thereof, to facilitate mechanical coupling of the cover plate 110 thereto.

The cover plate 110 is positioned over the opening 120 of the unitary body 108 and secured thereto under compression via one or more compression fasteners 126 (only one called out for clarity). Compression fasteners 126 may be a set of through bolts which engage or penetrate the cover plate 110 and the peripheral flange 124 of the unitary body 108 via through-holes, which compression fasteners 126 are then secured with nuts 128 (only one called out for clarity) to apply a general compression force across the elements, as shown in FIG. 11. Alternatively, bands (e.g., metal band, spring steel band) may circumscribe the cover plate 110 and the unitary body 108 to apply a general compression force across the respective elements of thermal storage apparatus 100.

Alternatively or additionally, the cover plate 110 can be either adhesively joined or fusion bonded (e.g., welded, brazed, soldered) to the unitary body 108. These bonds would also act as inherent seals, therefore a gasket or O-ring may be omitted.

One or more gaskets or seals 130 (FIG. 11) may be positioned between the cover plate 110 and the peripheral flange 124 of the unitary body 108. For example, an annular or generally closed-loop gasket may be positioned between the cover plate 110 and the peripheral flange 124 of the unitary body 108. The seal 130 can be substantially flat, even when uncompressed. Alternatively, the seal 130 may have a generally circular or oval cross-section (e.g., O-ring), particularly where one or both of the cover plate 110 and, or the peripheral flange 124 of the unitary body 108 have a recess 132 (FIG. 11) sized and dimensioned to partially receive the seal therein, The cover plate 110 may include a port 134 which may be a sealed cap or threaded cap, for example, allowing for pouring in phase change material (not illustrated in FIG. 11 or 12) or for the removal of phase change material from cavity 112. In use, phase change material is disposed in cavity 112. Phase change material may not fill the entirety of cavity 112, but rather may leave a vapour space 136 above the phase change material, as illustrated in other implementations described herein.

The cover plate 110 includes a heat exchange fluid inlet 138a in fluid communication with heat exchanger 106. The cover plate 110 includes a heat exchange fluid outlet 138b in fluid communication with heat exchanger 106. The heat exchange fluid inlet 138a and heat exchange fluid outlet 138b may both be conveniently accessible from a top of the thermal storage apparatus 100.

The cover plate 110 may include a fitting 142 to fluidly couple to a pressure balance reservoir (not shown), for example via a flexible hose (not shown). The pressure balance reservoir can be employed to pressure balance the air/vapour space 136 in the cavity 112. The source of pressure may be the result of thermal expansion of the phase change material and, or, due to increased vapour pressure of the liquid phase change material at elevated temperature.

The cover plate 110 may include a fitting 140 to thermally or fluidly couple a temperature sensor (not shown) thereto to determine a temperature of a phase change material contained inside cavity 112.

When assembled, the heat exchanger 106 is positioned in the interior of cavity 112 of the housing 102, sealed therein by the cover plate 110, and typically submerged in the phase change material when in operation. The heat exchanger 106 preferably has a large surface area relative to a volume thereof, for example employing a plurality of heat exchange structures 146 (only one called out for clarity), for example fins or pins, that have a large surface area relative to a volume of the respective heat exchange structures. The heat exchanger 106 may take a variety of forms, for example, the outward facing finned plates heat exchanger illustrated in FIGS. 11-13, the finned tubing heat exchanger illustrated in FIGS. 14-15, inward facing finned plates (either double or single sided with fins), pinned plates, or the flat channel plates illustrated, for instance in FIG. 1. As illustrated, the heat exchanger 106 preferably has a body (e.g., opposed plates 148*a*, 148*b* (FIG. 12) secured to one another via fusion bonding (e.g., welding, brazing, soldering), adhesive, fasteners, and, or compression bands) 148 that forms a fluid flow path 149 (FIG. 13) for heat exchange fluid therethrough. The fluid flow path 149 is preferably a circuitous fluid flow path 149, extending from one portion of the body 148 to another portion of the body 148 and traversing at least a majority of the body 148 of the heat exchanger 106. The body 148 of the heat exchanger 106 can be similar or even identical to the flow plates previously described, however positioned as a structure within the cavity 112 and spaced from the walls thereof.

The heat exchange structures (e.g., fins) 146 may extend laterally outward from the body 148 of the heat exchanger 106, and may be aligned vertically in the cavity 112. That is, the heat exchange structures (e.g., fins) 146 may extend at least partially from at least proximate the bottom 116 of the unitary body 108 toward the cover plate 110. The heat exchange structures (e.g., fins) 146 may extend only partially laterally across the cavity 112, to prevent forming isolated pockets therebetween.

The external seed crystal reservoir trigger assembly 72 includes a sidewall fitting 70 affixed and in thermal communication (e.g., thermally conductive path) to body 108 and in fluid communication with cavity 112 and is at least partially immersed by phase change material, an isolation valve 74 outside of body 108 mechanically engaged and in fluid communication to the exterior port of sidewall fitting 70, a seed crystal reservoir tube 78 that is mechanically engaged and in fluid communication to isolation valve 74 at one end and mechanically engaged and in fluid communication with pressure balancing port 76 at the other end, and solid phase change material reserve 80 contained inside see crystal reservoir tube 78 in close proximity to isolation valve 74. While only a single external seed crystal reservoir trigger assembly 72 is illustrated, some implementations may include two or more external seed crystal reservoir trigger assemblies.

Isolation valve 74 is moveable to a closed conformation or configuration at the resting unactuated or unopened state, for instance with the valve actuator (ball) turned, positioned and/or oriented so as to deny fluid communication between the two ports of isolation valve 74. It is believed that the combination of isolation valve 74 in a closed conformation or configuration where the actuator (ball) is turned, positioned or oriented so as to deny fluid communication between the two ports of isolation valve 74 produces a seal that sufficiently isolates solid phase change material 80 from the surrounding bulk phase change material, even when heated above the melting temperature. It is also believed the location of seed crystal reservoir tube 78 exterior to body 108 maintains solid phase change material 80 at a sufficiently cool temperature to remain solid, even when the phase change material in cavity 112 is heated above the melting temperature. In such a conformation or configuration, external seed crystal reservoir trigger assembly 72 contains at least one seed crystal of phase change material in the solid state.

Isolation valve 74 is moveable to an opened configuration at the active actuated or opened state, for instance with the valve actuator (ball) turned, positioned or oriented so as to permit fluid communication between the two ports of isolation valve 74. Isolation valve 74 may be actuated manually, or may be actuated with a solenoid or other mechanical or electro-mechanical motor or servo or the like to open or close isolation valve 74 upon demand.

The thermal storage apparatus 100 advantageously provides a structure that allows "drop in" assembly.

For example, the thermal storage apparatus 100 may be assembled by positioning the heat exchanger 106 in the unitary body 108 via the opening 120 therein, then positioning the cover plate 110 over the opening 120, and fastening the cover plate 110 to the unitary body 108, either with or without a gasket therebetween. Phase change material may be added to the cavity 112 either via the opening 102, before positioning the cover plate 110, or can be added via the port 134 after fixing the cover plate 110 to the unitary body. A temperature sensor may be coupled to the corresponding fixture either before the cover plate 110 is positioned, or after the cover plate 110 is positioned. Coupling to the heat exchange fluid inlet 138*a* and heat exchange fluid outlet 138*b* may be made after assembly, as can a coupling to a pressure reservoir.

Even more advantageously, the heat exchanger 106 may be first be secured to the cover plate 110. For instance, the heat exchanger 106 may be physically coupled to the cover plate 110 via one or more fixtures that form the fluid inlet and outlet 138*a*, 138*b*. Also for instance, one or more bearings may be carried by the cover plate 110. The heat exchanger 106 is then dropped into the cavity as the cover plate is positioned over the opening 120. The cover plate 110 is then fastened to the unitary body 108, either with or without a gasket therebetween. Coupling to the heat exchange fluid inlet 138*a* and heat exchange fluid outlet 138*b* may be made after assembly. Phase change material may be added to the cavity 112 either via the opening 102, before positioning the cover plate 110, or can be added via the port 134 after fixing the cover plate 110 to the unitary body. A temperature sensor may be coupled to the corresponding fixture either before the cover plate 110 is positioned, or after the cover plate 110 is positioned. Coupling to the heat exchange fluid inlet 138*a* and heat exchange fluid outlet 138*b* may be made after assembly, as can a coupling to a pressure reservoir.

In operation, the thermal storage apparatus 100 may function in a similar fashion to the various other implementations described herein.

Figure 14:
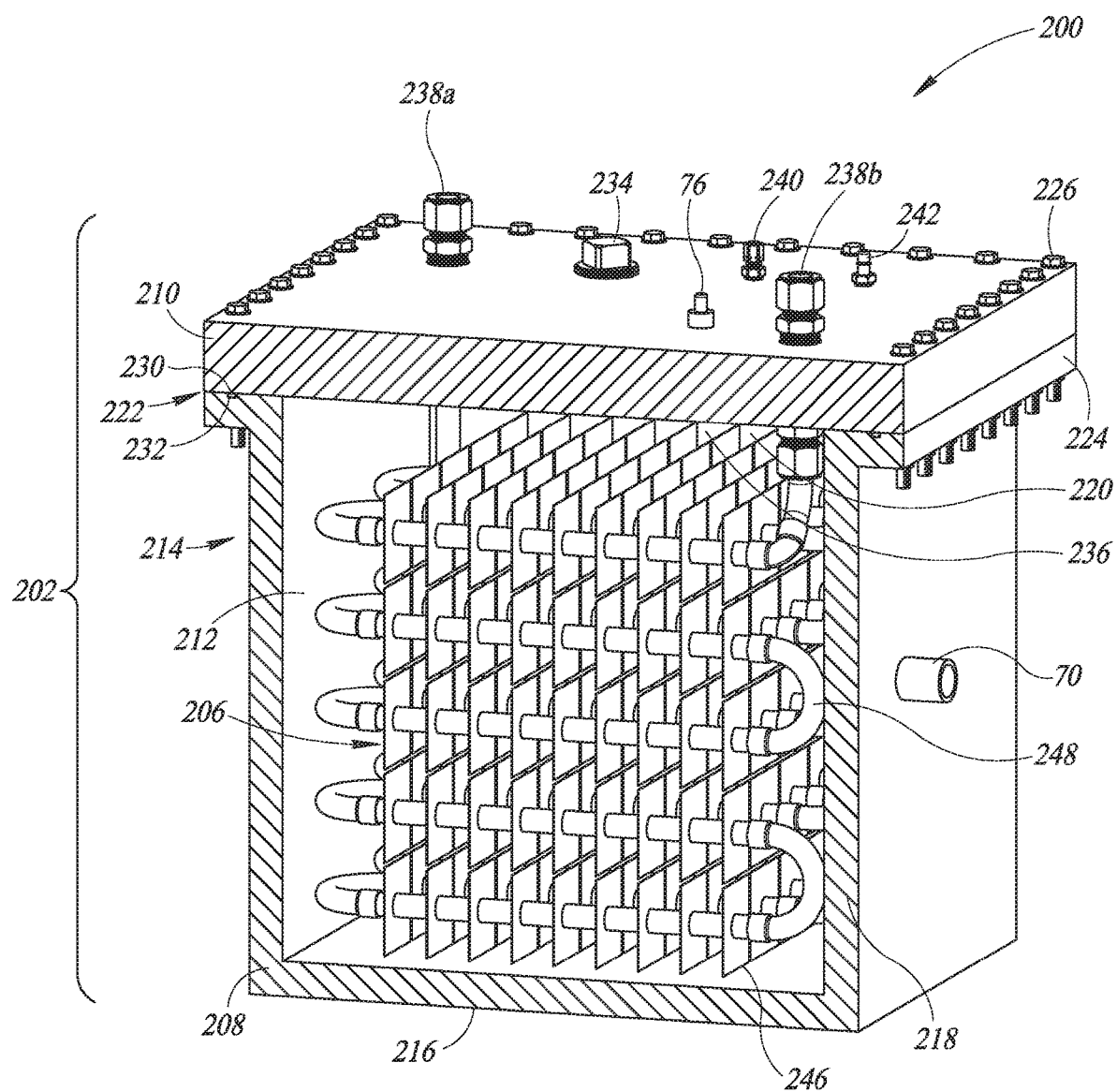
FIG. 14 is a first perspective cross-section view of a thermal energy storage apparatus taken along a first plane, having housing composed of a unitary body and a cover plate, the cover plate fixable to the unitary body to seal an interior of the housing from an exterior thereof, and a finned tube heat exchanger positioned in the interior of the housing with a set of vertically extending fins, according to one embodiment.
Figure 15:
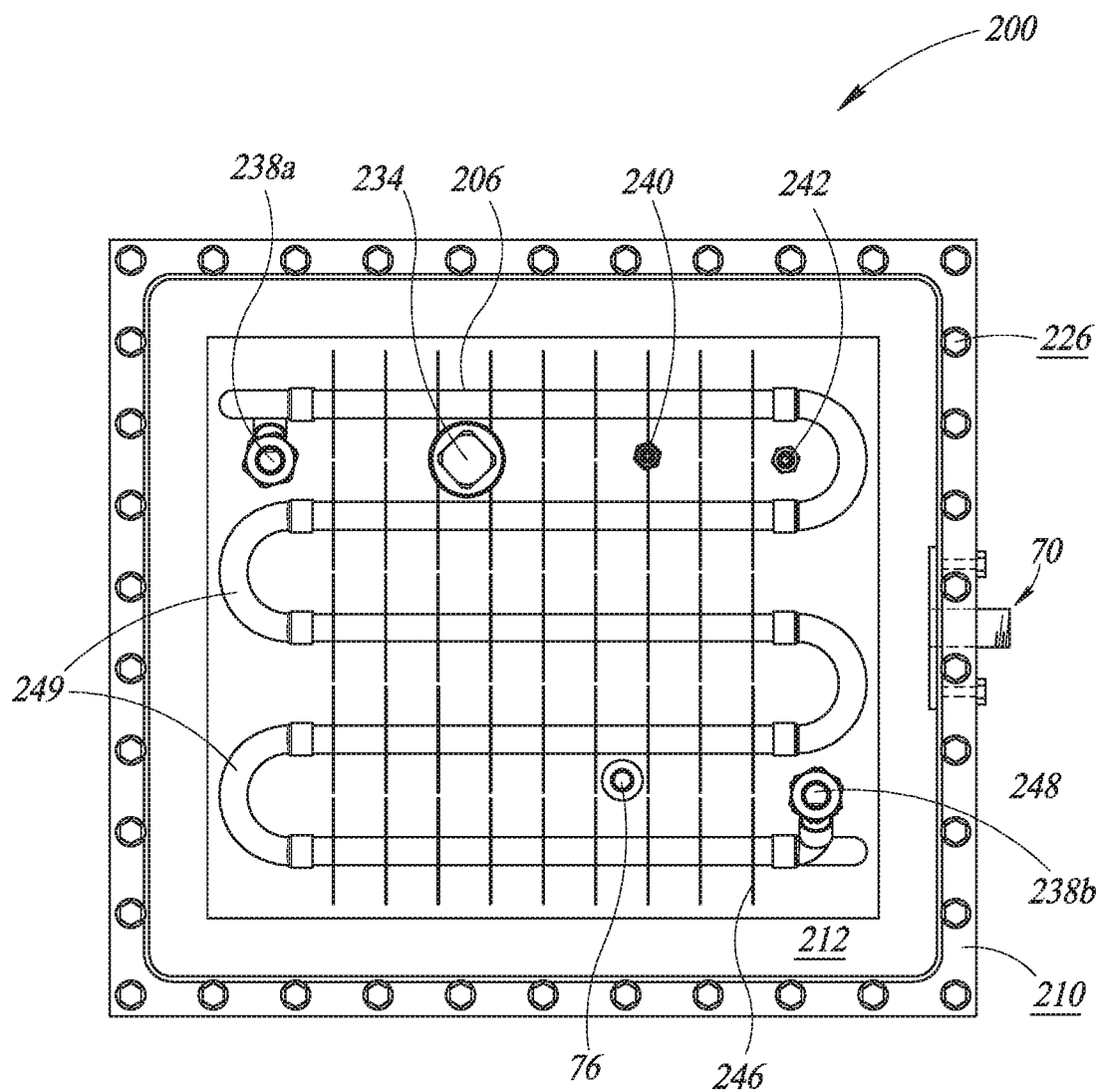
FIG. 15 is a top plane view of the thermal energy storage apparatus of FIG. 14 with the cover illustrated as transparent to better illustrate an internal structure of the thermal energy storage apparatus.
Figure 16:
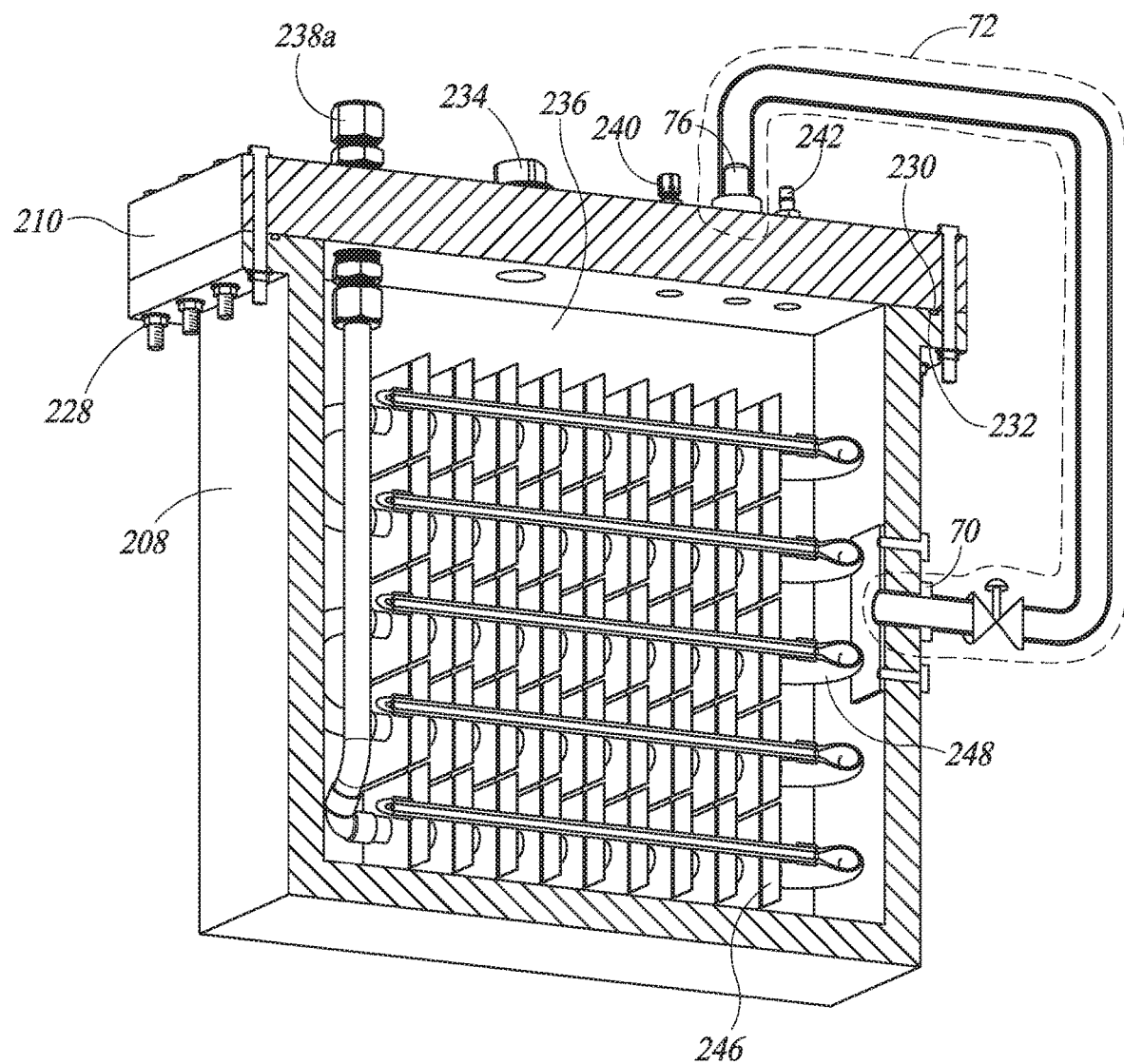
FIG. 16 is a second perspective cross-section view of the thermal energy storage apparatus of FIG. 14, taken along a second plane.

FIGS. 14, 15 and 16 show a thermal energy storage apparatus 200, according to at least one illustrated embodiment. The thermal energy storage apparatus 200 comprises a housing 202 and a heat exchanger 206. The housing 202 is composed of a unitary body 208 and a cover plate 210.

The unitary body 208, which can be denominated as a bucket, is preferably a unitary (i.e., single piece construction), including a number of walls that delineate an interior or cavity 212 from an exterior 214 of the unitary body 208. The unitary body 208 preferably comprises a non-reactive material, for example a plastic, for instance a thermoplastic (e.g., polypropylene, high density polyethylene (HDPE)) or a thermosetting plastic, which may or may not take the form of a reinforced plastic material, for instance a resin reinforced with fibrous material (e.g., carbon fiber, fiberglass). The unitary body 208 can be formed via various molding techniques, for example injection molding, reaction injection molding, cast molding, thermoforming, or compression molding. Alternatively, the unitary body 208 can comprise other materials, for example various metals.

The unitary body 208 is preferably completely sealed at a bottom 216 thereof, and along any side edges 218 (only one called out) thereof. Preferably, the unitary body 208 has only a single opening 220, located at a top 222 thereof, to provide access to the interior or cavity 212 during manufacture or assembly of the thermal energy storage apparatus 200. The unitary body 208 may include a peripheral flange 224 about the top 222 thereof, to facilitate mechanical coupling of the cover plate 210 thereto.

The cover plate 210 is positioned over the opening 220 of the unitary body 208 and secured thereto under compression via one or more compression fasteners 226 (only one called out for clarity). Compression fasteners 226 may be a set of through bolts which engage or penetrate the cover plate 210 and the peripheral flange 224 of the unitary body 208 via through-holes, which compression fasteners 226 are then secured with nuts 228 (FIG. 16, only one called out for clarity) to apply a general compression force across the elements, as shown in FIG. 14. Alternatively, bands (e.g., metal band, spring steel band) may circumscribe the cover plate 210 and the unitary body 208 to apply a general compression force across the respective elements of thermal storage apparatus 100.

Alternatively or additionally, the cover plate 210 can be either adhesively joined or fusion bonded (e.g., welded, brazed, soldered) to the unitary body 208. These bonds would also act as inherent seals, therefore a gasket or O-ring may be omitted.

One or more gaskets or seals 230 (FIG. 14) may be positioned between the cover plate 210 and the peripheral flange 224 of the unitary body 208. For example, an annular or generally closed-loop gasket may be positioned between the cover plate 210 and the peripheral flange 224 of the unitary body 208. The seal 230 can be substantially flat, even when uncompressed. Alternatively, the seal 230 may have a generally circular or oval cross-section (e.g., O-ring), particularly where one or both of the cover plate 210 and, or the peripheral flange 224 of the unitary body 208 have a recess 232 (FIG. 14) sized and dimensioned to partially receive the seal therein.

The cover plate 210 may include a port 234 which may be a sealed cap or threaded cap, for example, allowing for pouring in phase change material (not illustrated in FIG. 14 or 15) or for the removal of phase change material from cavity 212. In use, phase change material is disposed in cavity 212. Phase change material may not fill the entirety of cavity 212, but rather may leave a vapour space 236 above the phase change material, as illustrated in other implementations described herein.

The cover plate 210 includes a heat exchange fluid inlet 238a in fluid communication with heat exchanger 206. The cover plate 210 includes a heat exchange fluid outlet 238b in fluid communication with heat exchanger 206. The heat exchange fluid inlet 238a and heat exchange fluid outlet 238b may both be conveniently accessible from a top of the thermal storage apparatus 200.

The cover plate 210 may include a fitting 242 to fluidly couple to a pressure balance reservoir (not shown), for example via a flexible hose (not shown). The pressure balance reservoir can be employed to pressure balance the air/vapour space 236 in the cavity 212. The source of pressure may be the result of thermal expansion of the phase change material and, or, due to increased vapour pressure of the liquid phase change material at elevated temperature.

The cover plate 210 may include a fitting 240 to thermally or fluidly couple a temperature sensor (not shown) thereto to determine a temperature of a phase change material contained inside cavity 212.

When assembled, the heat exchanger 206 is positioned in the interior of cavity 212 of the housing 202, sealed therein by the cover plate 210, and typically submerged in the phase change material when in operation. The heat exchanger 206 preferably has a large surface area relative to a volume thereof, for example employing a plurality of heat exchange structures 246 (only one called out for clarity), for example fins or pins, that have a large surface area relative to a volume of the respective heat exchange structures. The heat exchanger 206 may take a variety of forms, for example, the finned tubing heat exchanger illustrated in FIGS. 14-15, the outward facing finned plates heat exchanger illustrated in FIGS. 11-13, inward facing finned plates (either double or single sided with fins), pinned plates, or the flat channel plates illustrated, for instance in FIG. 1. As illustrated, the heat exchanger 206 preferably has a serpentine conduit 248 that provides a circuitous a fluid flow path 249 (FIG. 15) for heat exchange fluid therethrough.

The heat exchange structures (e.g., fins) 246 may extend laterally outward from the serpentine conduit 248 of the heat exchanger 206, and may be array in the cavity 212. The heat exchange structures (e.g., fins) 246 may extend at least partially from at least proximate the bottom 216 of the unitary body 208 toward the cover plate 210. The heat exchange structures (e.g., fins) 246 may extend only partially laterally across the cavity 212, to prevent forming isolated pockets therebetween.

The external seed crystal reservoir trigger assembly 72 includes a sidewall fitting 70 affixed and in thermal communication (e.g., thermally conductive) to housing 202 and in fluid communication with cavity 212 and is positioned to be at least partially immersed by phase change material, an isolation valve 74 outside of housing 202 mechanically engaged and in fluid communication to the exterior port of sidewall fitting 70, a seed crystal reservoir tube 78 that is mechanically engaged and in fluid communication to isolation valve 74 at one end and mechanically engaged and in fluid communication with pressure balancing port 76 at the other end, and solid phase change material reserve 80 contained inside seed crystal reservoir tube 78 in close proximity to isolation valve 74. While only a single external seed crystal reservoir trigger assembly 72 is illustrated, some implementations may include two or more external seed crystal reservoir trigger assemblies.

Isolation valve 74 is moveable to a closed conformation or configuration at the resting unactuated or unopened state, for instance with the valve actuator (ball) turned, positioned or oriented so as to deny fluid communication between the two ports of isolation valve 74. It is believed that the combination of isolation valve 74 in a closed conformation where the actuator (ball) is turned, positioned or oriented so as to deny fluid communication between the two ports of isolation valve 74 produces a seal that sufficiently isolates solid phase change material 80 from the surrounding bulk phase change material, even when heated above the melting temperature. It is also believed the location of seed crystal reservoir tube 78 exterior to housing 202 maintains solid phase change material 80 at a sufficiently cool temperature to remain solid, even when the phase change material in cavity 212 is heated above the melting temperature. In such a conformation or configuration, external seed crystal reservoir trigger assembly 72 contains at least one seed crystal of phase change material in the solid state.

Isolation valve 74 is moveable to an opened conformation or configuration at the active actuated or opened state, for instance with the valve actuator (ball) turned, positioned or oriented so as to permit fluid communication between the two ports of isolation valve 74. Isolation valve 74 may be actuated manually, or may be actuated with a solenoid or other mechanical or electro-mechanical motor or servo or the like to open or close isolation valve 74 upon demand.

The thermal storage apparatus 200 advantageously provides a structure that allows "drop in" assembly.

For example, the thermal storage apparatus 200 may be assembled by positioning the heat exchanger 206 in the unitary body 208 via the opening 220 therein, then positioning the cover plate 210 over the opening 220, and fastening the cover plate 210 to the unitary body 208, either with or without a gasket therebetween. Phase change material may be added to the cavity 212 either via the opening 202, before positioning the cover plate 210, or can be added via the port 234 after fixing the cover plate 210 to the unitary body. A temperature sensor may be coupled to the corresponding fixture either before the cover plate 210 is positioned, or after the cover plate 210 is positioned. Coupling to the heat exchange fluid inlet 238a and heat exchange fluid outlet 238b may be made after assembly, as can a coupling to a pressure reservoir.

Even more advantageously, the heat exchanger 206 may be first be secured to the cover plate 210. For instance, the heat exchanger 206 may be physically coupled to the cover plate 210 via one or more fixtures that form the fluid inlet and outlet 238a, 238b. Also for instance, one or more bearings may be carried by the cover plate 210. The heat exchanger 206 is then dropped into the cavity as the cover plate is positioned over the opening 220. The cover plate 210 is then fastened to the unitary body 208, either with or without a gasket therebetween. Coupling to the heat exchange fluid inlet 238a and heat exchange fluid outlet 238b may be made after assembly. Phase change material may be added to the cavity 212 either via the opening 202, before positioning the cover plate 210, or can be added via the port 234 after fixing the cover plate 210 to the unitary body. A temperature sensor may be coupled to the corresponding fixture either before the cover plate 210 is positioned, or after the cover plate 210 is positioned. Coupling to the heat exchange fluid inlet 238a and heat exchange fluid outlet 238b may be made after assembly, as can a coupling to a pressure reservoir.

In operation, the thermal storage apparatus 200 may function in a similar fashion to the various other implementations described herein.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

U.S. patent application Ser. No. 15/211,878, filed Jul. 15, 2016; and U.S. Patent Application Ser. No. 62/815,098, filed Mar. 7, 2019, which are each incorporated herein by reference in their entirety.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A thermal energy storage apparatus, comprising:
   a housing that forms a cavity;
   an amount of a phase change material located in the cavity, the phase change material convertible between a supercooled liquid state and a solid state;
   an external seed crystal reservoir trigger assembly operable to be in fluid communication with the amount of the phase change material and upon fluid communication with the amount of the phase change material trigger a state change of the amount of the phase change material from the supercooled liquid state to the solid state, and thereby release thermal energy stored in the amount of the phase change material;
   a first port that provides passage through the housing and into the cavity, the first port positioned such that the first port is submerged within the amount of the phase change material; and
   a second port that provides passage through the housing and into the cavity, the second port positioned above the amount of the phase change material,
   wherein the external seed crystal reservoir trigger assembly is coupled to both the first port and the second port.

2. The thermal energy storage apparatus of claim 1 wherein the housing comprises:
   a base;
   a fluid flow plate positioned with respect to the base to form the first cavity therebetween
   an end plate positioned relative the fluid flow plate to form a fluid flow channel;
   a fluid inlet port in fluid communication with the fluid flow channel for the ingress of a heat exchange fluid into the fluid flow channel; and
   a fluid outlet port in fluid communication with the fluid flow channel for the egress of the heat exchange fluid from the fluid flow channel,
   wherein thermal energy released by the state change of the amount of the phase change material is transferred across the fluid flow plate, from the amount of the phase change material to the heat exchange fluid in the fluid flow channel.

3. The thermal energy storage apparatus of claim 1 wherein the housing is a first housing, the cavity is a first cavity, the amount is a first amount, the external seed crystal reservoir trigger assembly is a first external seed crystal reservoir trigger assembly, and the thermal energy storage apparatus further comprises:
- a second housing that forms a second cavity;
- a second amount of the phase change material located in the second cavity; and
- a second external seed crystal reservoir trigger assembly operable to be in fluid communication with the second amount of the phase change material and upon fluid communication with the second amount of phase change material trigger a state change of the second amount of phase change material from the supercooled liquid state to the solid state, and thereby release thermal energy stored in the second amount of the phase change material.

4. The thermal energy storage apparatus of claim 1 wherein the housing comprises a unitary body and a cover plate, the unitary body having an opening that provides access to the cavity, the cover plate fixable to the unitary body to seal the cavity from an exterior of the housing, the thermal energy storage apparatus further comprising:
- a heat exchanger positioned in the cavity of the unitary body,
- wherein the heat exchanger includes a body and a plurality of fins that extend laterally from the body of the heat exchanger.

5. The thermal energy storage apparatus of claim 4 wherein the second port is positioned in the cover plate such that the second port provides passage through the cover plate and into the cavity.

6. The thermal energy storage apparatus of claim 1 wherein the external seed crystal reservoir trigger assembly comprises:
- a reservoir;
- a reserve of the phase change material in the solid state and located in the reservoir; and
- an isolation valve operable to selectively, alternatively provide fluid communication and prevent fluid communication between the reserve of the phase change material and the first amount of the phase change material.

7. The thermal energy storage apparatus of claim 6 wherein the first port includes a sidewall fitting that provides a fluidly communicative coupling between the isolation valve and the cavity of the housing.

8. The thermal energy storage apparatus of claim 1 wherein the first port provides passage through the housing and into the cavity along a first direction, and the second port provides passage through the housing and into the cavity along a second direction that is perpendicular to the first direction.

9. The thermal energy storage apparatus of claim 1 wherein the amount of phase change material in the cavity is a first amount of the phase change material, the external seed crystal reservoir trigger assembly includes an isolation valve having an actuator that is actuable between a closed configuration and an open configuration to trigger the state change of the phase change material, and the actuator is transitional from the open configuration to the closed configuration with a second amount of the phase change material in the solid state positioned within the isolation valve such that the actuator in the closed configuration isolates a first portion of the second amount of the phase change material from a second portion of the second amount of phase change material.

10. A thermal energy storage apparatus, comprising:
housing that forms a cavity;
- a first fluid inlet port in fluid communication with a first fluid flow path for the ingress of a first heat exchange fluid into the first fluid flow path;
- a first fluid outlet port in fluid communication with the first fluid flow path for the egress of the first heat exchange fluid from the first fluid flow path;
- a first amount of a phase change material located in the cavity, the phase change material convertible between a supercooled liquid state and a solid state; and
- an external seed crystal reservoir trigger assembly operable to transition from a first configuration to a second configuration, wherein in the second configuration the external seed crystal trigger assembly is in fluid communication with the cavity to trigger a state change of the first amount of the phase change material from the supercooled liquid state to the solid state, and thereby release thermal energy stored in the first amount of the phase change material, wherein the external seed crystal reservoir trigger assembly includes an isolation valve having an actuator that is actuable between a closed configuration and an open configuration to transition the external seed crystal reservoir trigger assembly from the first configuration to the second configuration; and
- wherein the actuator is transitional from the open configuration to the closed configuration with a second amount of the phase change material in the solid state positioned within the isolation valve such that the actuator in the closed configuration isolates a first portion of the second amount of the phase change material from a second portion of the second amount of phase change material.

11. The thermal energy storage apparatus of claim 10, further comprising:
- a base;
- a first fluid flow plate;
- a second fluid flow plate, the first and the second fluid flow plates positioned with respect to one another and positioned with respect to the base to define the cavity therebetween;
- a first end plate positioned with respect to the first fluid flow plate to define the first fluid flow path therebetween;
- a second end plate positioned with respect to the second fluid flow plate to define therebetween a second fluid flow path,
- a second fluid inlet port in fluid communication with the second fluid flow channel for the ingress of a second heat exchange fluid into the second fluid flow path;
- a second fluid outlet port in fluid communication with the second fluid flow path for the egress of the second heat exchange fluid from the second fluid flow path, and
- wherein the second fluid flow plate thermally couples the cavity to the second fluid flow path such that the second heat exchange fluid in the second fluid flow path receives at least a portion of the released thermal energy.

12. The thermal energy storage apparatus of claim 11 wherein the first fluid inlet port and the second fluid inlet port are in fluid communication with each other within the base.

13. The thermal energy storage apparatus of claim 11 wherein the first fluid outlet port and the second fluid outlet port are in fluid communication with each other within the base.

14. The thermal energy storage apparatus of claim 11, further comprising:
a film disposed between the base and the first fluid flow plate, wherein the film chemically isolates the first fluid flow plate from the phase change material while maintaining thermal conductivity between the first fluid flow plate and the phase change material.

15. The thermal energy storage apparatus of claim 10, further comprising:
at least one baffle within the cavity, wherein the at least one baffle obstructs a portion of the phase change material in the solid state from sinking all the way to a bottom of the cavity through a portion of the phase change material in the supercooled liquid state.

16. The thermal energy storage apparatus of claim 10, further comprising:
at least one sidewall fitting that fluidly couples the external seed crystal reservoir trigger assembly and the phase change material contained inside the cavity.

17. The thermal energy storage apparatus of claim 16 wherein the at least one sidewall fitting provides a first passage through the housing, the thermal energy storage apparatus further comprising:
a fitting that fluidly couples the external seed crystal reservoir trigger assembly and the cavity thereby providing a second passage through the housing, wherein the second passage is positioned above the first passage.

18. The thermal energy storage apparatus of claim 17 wherein the second passage is positioned above an entirety of the phase change material located within the cavity.

19. The thermal energy storage apparatus of claim 10 wherein the external seed crystal reservoir trigger assembly comprises:
a reservoir of a reserve of the phase change material in the solid state;
wherein the actuator is operable to selectively, alternatively provide fluid communication and prevent fluid communication between the reserve of the phase change material and the first amount of the phase change material.

20. The thermal energy storage apparatus of claim 19 wherein a sidewall fitting provides a fluidly communicative coupling between the isolation valve and the cavity.

* * * * *